United States Patent
Tilton

(10) Patent No.: US 11,479,916 B2
(45) Date of Patent: *Oct. 25, 2022

(54) COMPOSITE STRUCTURES FOR PACKAGING ARTICLES AND RELATED METHODS

(71) Applicant: Smart Planet Technologies, Inc., Newport Beach, CA (US)

(72) Inventor: Christopher R. Tilton, Laguna Hills, CA (US)

(73) Assignee: Smart Planet Technologies, Inc., Newport, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/828,382

(22) Filed: Mar. 24, 2020

(65) Prior Publication Data
US 2020/0291579 A1 Sep. 17, 2020

Related U.S. Application Data

(63) Continuation of application No. 15/655,778, filed on Jul. 20, 2017, now Pat. No. 10,633,799, which is a
(Continued)

(51) Int. Cl.
*D21H 19/22* (2006.01)
*D21J 1/08* (2006.01)
(Continued)

(52) U.S. Cl.
CPC ............. *D21H 19/22* (2013.01); *B31B 50/26* (2017.08); *B31B 50/64* (2017.08); *B31D 1/021* (2013.01);
(Continued)

(58) Field of Classification Search
CPC .......... D21H 9/22; D21H 27/10; D21H 27/30; B31B 50/24; B31B 50/61; B31B 27/20
(Continued)

(56) References Cited

U.S. PATENT DOCUMENTS

| 3,441,473 A | 4/1969 | Brundige et al. |
| 3,894,904 A | 7/1975 | Cook |

(Continued)

FOREIGN PATENT DOCUMENTS

| EP | 0326410 A2 | 8/1989 |
| EP | 0811508 A1 | 12/1997 |

(Continued)

OTHER PUBLICATIONS

AFFINITY Polyolefin Plastometers and Polyolefin Elastomers: Product Selection Guide, The Dow Chemical Company, Jul. 2013; 4 pgs.
(Continued)

*Primary Examiner* — Jacob T Minskey
(74) *Attorney, Agent, or Firm* — Kevin Schraven; Anooj Patel; Hankin Patent Law, APC

(57) ABSTRACT

The composite structure includes a fiber-containing layer, such as a fiberboard layer or other layer having fibers from natural and/or synthetic sources, and a mineral-containing layer covering the fiber-containing layer. The fiber-containing layer and mineral-containing layer can be shaped, sized and manufactured such that the composite structure formed therefrom is capable of being machined to form a storage article. The composite structure has advantages in that it can improve whiteness, opacity, ink adhesion, materials reduction, barrier properties, recyclability, and printability. The composite can reduce polymer mass requirements for heat seal, barrier, and fiber adhesion. Further improvements include economics, pliability, and flexibility that is increased over the pliability of the fiber-containing layer alone.

48 Claims, 13 Drawing Sheets

Related U.S. Application Data continuation of application No. 14/213,394, filed on Mar. 14, 2014, now abandoned.

(60) Provisional application No. 61/782,291, filed on Mar. 14, 2013.

(51) Int. Cl.

| | | |
|---|---|---|
| *D21H 27/10* | (2006.01) | |
| *D21H 27/30* | (2006.01) | |
| *B32B 27/20* | (2006.01) | |
| *B32B 27/32* | (2006.01) | |
| *B31D 1/02* | (2006.01) | |
| *B31B 50/26* | (2017.01) | |
| *B32B 27/12* | (2006.01) | |
| *B31B 50/64* | (2017.01) | |
| *B31B 100/00* | (2017.01) | |

(52) U.S. Cl.
CPC .............. *B32B 27/12* (2013.01); *B32B 27/20* (2013.01); *B32B 27/32* (2013.01); *D21H 27/10* (2013.01); *D21H 27/30* (2013.01); *D21J 1/08* (2013.01); *B31B 2100/00* (2017.08); *B31B 2100/002* (2017.08); *B32B 2264/104* (2013.01); *B32B 2307/702* (2013.01); *B32B 2307/704* (2013.01); *B32B 2307/75* (2013.01); *B32B 2439/02* (2013.01); *Y10T 428/277* (2015.01); *Y10T 428/31938* (2015.04)

(58) Field of Classification Search
USPC .......................................................... 493/82
See application file for complete search history.

(56) References Cited

U.S. PATENT DOCUMENTS

| | | | |
|---|---|---|---|
| 3,911,191 A | 10/1975 | Guastella et al. | |
| 4,028,452 A | 6/1977 | Driscoll | |
| 4,120,916 A | 10/1978 | Meyer, Jr. et al. | |
| 4,210,487 A | 7/1980 | Driscoll | |
| 4,254,173 A | 3/1981 | Peer, Jr. | |
| 4,368,841 A | 1/1983 | Eddy | |
| 4,472,229 A | 9/1984 | Martin | |
| 4,507,358 A | 3/1985 | Takaoka et al. | |
| 4,692,212 A | 9/1987 | Swenson et al. | |
| 4,851,458 A | 7/1989 | Hopperdietzel | |
| 4,853,276 A | 8/1989 | Kunishima | |
| 4,894,192 A | 1/1990 | Warych | |
| 4,946,372 A | 8/1990 | Avni | |
| 5,053,268 A | 10/1991 | Ehara et al. | |
| 5,084,360 A | 1/1992 | Young | |
| 5,434,004 A | 7/1995 | Ajioka et al. | |
| 5,494,735 A | 2/1996 | Nitta | |
| 5,515,975 A | 5/1996 | Jarvis et al. | |
| 5,803,260 A | 9/1998 | Tilton | |
| 5,827,607 A | 10/1998 | Deaner et al. | |
| 5,837,383 A | 11/1998 | Wenzel et al. | |
| 5,863,414 A | 1/1999 | Tilton | |
| 5,962,123 A | 10/1999 | Mehta et al. | |
| 6,010,595 A | 1/2000 | Mitchell et al. | |
| 6,016,913 A | 1/2000 | Tilton | |
| 6,150,005 A | 11/2000 | Williams et al. | |
| 6,183,814 B1 | 2/2001 | Nangeroni et al. | |
| 6,224,973 B1 | 5/2001 | Trouilhet | |
| 6,231,970 B1 | 5/2001 | Andersen et al. | |
| 6,258,308 B1 | 7/2001 | Brady et al. | |
| 6,274,248 B1 | 8/2001 | Goto et al. | |
| 6,387,504 B1 | 5/2002 | Mushovic | |
| 6,416,620 B1 | 7/2002 | Narancic et al. | |
| 6,730,249 B2 | 5/2004 | Sears et al. | |
| 6,787,205 B1 | 9/2004 | Aho et al. | |
| 7,452,573 B2 | 11/2008 | Fish et al. | |
| 7,740,740 B2 | 6/2010 | Mohan et al. | |
| 7,749,583 B2 | 7/2010 | Fugitt et al. | |
| 7,954,306 B2 | 6/2011 | Gould | |
| 8,889,228 B2 | 11/2014 | Zuercher et al. | |
| 2002/0127358 A1 | 9/2002 | Berlin et al. | |
| 2003/0203231 A1 | 10/2003 | Stopper et al. | |
| 2003/0211348 A1 | 11/2003 | Mueller et al. | |
| 2003/0232211 A1 | 12/2003 | Kendall et al. | |
| 2004/0023052 A1 | 2/2004 | Ambroise | |
| 2004/0052987 A1 | 3/2004 | Shetty et al. | |
| 2004/0127614 A1 | 7/2004 | Jiang et al. | |
| 2004/0249046 A1 | 12/2004 | Abhari et al. | |
| 2005/0238824 A1 | 10/2005 | Ogonowski et al. | |
| 2006/0151350 A1 | 7/2006 | Tilton | |
| 2006/0167169 A1 | 7/2006 | Arana | |
| 2006/0198987 A1 | 9/2006 | Grob et al. | |
| 2006/0286325 A1 | 12/2006 | Swoboda et al. | |
| 2007/0025904 A1 | 2/2007 | Skuse et al. | |
| 2007/0051652 A1 | 3/2007 | Tilton | |
| 2009/0045210 A1 | 2/2009 | Tilton | |
| 2009/0047499 A1 | 2/2009 | Tilton | |
| 2009/0047511 A1 | 2/2009 | Tilton | |
| 2009/0047525 A1 | 2/2009 | Tilton | |
| 2009/0098375 A1 | 4/2009 | Voisin et al. | |
| 2009/0142528 A1 | 6/2009 | Tilton | |
| 2010/0003431 A1 | 1/2010 | Raybuck | |
| 2010/0065235 A1 | 3/2010 | Fike et al. | |
| 2010/0137493 A1 | 6/2010 | Tilton | |
| 2011/0151185 A1 | 6/2011 | Cree | |
| 2013/0323504 A1 | 12/2013 | Zhou et al. | |

FOREIGN PATENT DOCUMENTS

| | | | |
|---|---|---|---|
| FR | 2367594 A | 5/1976 | |
| GB | 1534128 A | 11/1976 | |
| JP | 62144931 | 6/1987 | |
| JP | 02033399 | 2/1990 | |
| JP | 08197829 | 6/1996 | |
| JP | 10059468 | 3/1998 | |
| JP | H11227111 A | 8/1999 | |
| JP | 2000015765 A | 1/2000 | |
| JP | 2001081695 A | 3/2001 | |
| JP | 201214396 | 8/2001 | |
| JP | 2003502180 A | 1/2003 | |
| JP | 2004507385 A | 3/2004 | |
| JP | 2004230620 A | 8/2004 | |
| JP | 2005053541 A | 3/2005 | |
| JP | 2006045578 A | 2/2006 | |
| JP | 2006150616 A | 6/2006 | |
| JP | 2006257583 A | 9/2006 | |
| JP | 200701517 | 1/2007 | |
| WO | 0187596 A1 | 11/2001 | |
| WO | 02102593 A1 | 12/2002 | |
| WO | 03029001 A1 | 4/2003 | |
| WO | 2004074130 A1 | 9/2004 | |
| WO | 2004106630 A2 | 12/2004 | |
| WO | 2005095515 A2 | 10/2005 | |
| WO | 2007078454 A2 | 7/2007 | |
| WO | 2009005947 A1 | 1/2009 | |
| WO | 2009026256 A1 | 2/2009 | |
| WO | 2010091427 A2 | 8/2010 | |
| WO | 2012032514 A1 | 3/2012 | |

OTHER PUBLICATIONS

Chemical Book, Diatomaceous earth(61790-53-2), 2016, obtained from http://www.chemicalbook.com/ProductMSDSDetailCB9729388EN.htm.

DOW ELITE 5800G: Enhanced Polyethylene Resin, Technical Information, The Dow Chemical Company, Jun. 10, 2008; 2 pgs.

DOW LDPE PG 7008 (Extrusion Coating): Low Density Polyethylene Resin, Technical Information, The Dow Chemical Company, Apr. 2013; 2 pgs.

DOW, DOW(TM) HDPE 06448N—High Density Polyethylene Resin, Oct. 2016, obtained from http://catalog.ides.com/docselect.aspx?I=68651&E=285140&DOC-DOWTDS&DS=123&DK=STD&DC=e.

Guy, et al., "Calcium Carbonate for Polyolefine Extrusion Coating Application," TAPPI Conference, Aug. 29 to Sep. 2, 2004; 4 pgs.

(56) References Cited

OTHER PUBLICATIONS

International Search Report on related PCT Application No. PCT/US2010/023671 from International Searching Authority (KIPO) dated Sep. 30, 2010.
International Search Report on related PCT Application No. PCT/US2014/028947 from International Searching Authority (KIPO) dated Aug. 1, 2014.
International Search Report on related PCT Application No. PCT/US2014/028962 from International Searching Authority (KIPO) dated Jul. 29, 2014.
Jokinen, Hanna, "Screening and Cleaning of Pulp—A Study to the Parameters Affecting Separation," Department of Process and Environmental Engineering, University of Oulu, 2017; 106 pgs.
Notice of Opposition to a European Patent for EP2393659 dated Mar. 13, 2019; 6 pgs.
Notice of Opposition: Facts and Arguments for EP2393659 dated Mar. 13, 2019; 19 pgs.
Office Action, "Notification of Reasons for Rejection" on related Japanese Patent Application No. 2011-549341 dated Nov. 12, 2013.
Patent Examiner's Wikipedia.com entry for "starch" on related U.S. Appl. No. 12/368,130, accessed May 17, 2014.
Scrap Specifications Circular, Oct. 22, 2009, 1-57, Institute of Scrap Recycling Inudstries, Inc., US.
TAPPI PLACE Division Conference: Aug. 29 to Sep. 2, 2004, Conference Proceedings; 7 pgs.

COMPOSITE STRUCTURES FOR PACKAGING ARTICLES AND RELATED METHODS

This application is a continuation application of allowed U.S. patent application Ser. No. 15/655,778, filed Jul. 20, 2017, which is a division of U.S. patent application Ser. No. 14/213,394, filed Mar. 14, 2014, now abandoned, which claims priority to U.S. Provisional Application Ser. No. 61/782,291, filed on Mar. 14, 2103, the entire contents of which are hereby incorporated by reference.

FIELD OF THE INVENTION

The present embodiments relate generally to composite structures, particularly those used to fabricate storage articles and consumer packaging, and related methods.

BACKGROUND

Packaging materials for product retail and shipping purposes are typically sufficiently durable to allow reliable use of the materials. Typical considerations in the development of such materials include their barrier performance, tensile and tear strength, resistance to wrinkling and scuffing, efficiency in manufacturing, as well as resistance to handling, infiltration by rodents and pests, and the ability of the materials and packaging made therefrom to deter theft. The packages and packaging materials are also desirably relatively inexpensive to manufacture, and are preferably attractive to the customer in appearance, print quality, feel, and touch to encourage use of the products as well as to enhance the product image or association.

SUMMARY OF THE INVENTION

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Any or all of the below listed aspects may be a part of the present embodiments:

Mineral particle densities within the polymer matrix of the mineral-containing layer may be from about 2.4 g/cm3 to about 4.9 g/cm3.

Mineral particles within the polymer matrix of the mineral-containing layer may comprise the cube and block class.

Calcium carbonate particles within the polymer matrix of the mineral-containing layer may have about 18-80% particle diameters finer than 6 μm and about 33-96% particle diameters less than 10 μm.

A hardness of mineral particles within the polymer matrix of the mineral-containing layer may be from about 2.0 to 4.0 Mohs.

Mineral particles within the polymer matrix of the mineral-containing layer may have 0.05 to 0.5 maximum % on 325 mesh per ASTM D1199.

Mineral particles within the polymer matrix of the mineral-containing layer may have a pH from about 8.5 to about 10.5.

The polymer bonding agent(s) within the mineral containing layer may have densities from about 0.908 g/cm3 to about 1.60 g/cm3.

The polymer bonding agent(s) within the mineral containing layer may have a physical melt flow index from about 4 g/m2/10 min to about 16 g/m2/10 min.

Minerals may be fully dispersed within the polymer bonding agent matrix.

The polymer bonding agent(s) within the mineral containing layer may have a molecular weight (Mz) from about 150,000 to about 300,000.

The polymer content weight of the mineral-containing layer may be from about 3.5 lbs/3 msf to about 50 lbs/3 msf.

The mineral-containing layer may have a modulus from about 1.8 GPa to about 4.5 GPa.

About 40-60% of the mineral-containing layer may have a coefficient of thermal expansion from about 1×10-6 in/in to about 8×10-6 in/in.

The mineral-containing layer may be applied to the fiber-containing layer in coat weights from about 3 g/m2 to about 20 g/m2.

Surfaces of the mineral-containing layer may have a coefficient of static friction from about 0.18 to about 0.59.

The mineral-containing layer may include a mixture of crystalline, semi-crystalline, and amorphous structures.

The polymer bonding agent(s) of the mineral-containing layer may have crystallinity from about 60% to about 85%.

The mineral-containing layer may contain coupling agents from about 0.05% to about 15% by weight.

The mineral-containing layer may contain from about 0.5% to about 10% plastomers and elastomers with densities from about 0.86 g/cm3 to about 0.89 g/cm3 per ASTM D 792.

The mineral-containing layer may have differential scanning calorimetry (DSC) melting peaks from about 59° C. to about 110° C.

The mineral-containing layer molecular weight ranges (Mw) may be from about 10,000 to about 100,000.

About 10% to about 70% of the mineral-containing layer may have a branching index (g') of about 0.99 or less as measured at the Z-average molecular weight (Mz) of the bonding agent.

The polymer bonding agent(s) of the mineral-containing layer may have an isotactic run length from about 1 to about 40.

The polymer bonding agent(s) of the mineral-containing layer may have a physical shear rate from about 1 to about 10,000 at temperatures from about 180° C. to about 410° C.

The mineral-containing layer may have a basis weight from about 0.5 lbs/msf to about 175 lbs/msf.

The polymer bonding agent(s) of the mineral-containing layer may have from about 20% to about 60% amorphous structure and from about 20% to about 55% crystalline structure.

The polymer bonding agent(s) of the mineral-containing layer may comprise polyethylene having an amorphous fraction from about 40% to about 85%.

The mineral-containing layer may have a copolymer isotacticity index from about 20% to about 50% as measured by the DSC method.

Mineral particles within the polymer matrix of the mineral-containing layer may have an average surface area from about 1.0-1.3 $m^2$/g to about 1.8-2.3 $m^2$/g.

Mineral particles within the polymer matrix of the mineral-containing layer may have a Green Hunter reflectance range from about 91% to about 97%, and a Blue Hunter reflectance range from about 89% to about 96%.

The fiber-containing layer may contain inorganic mineral coatings and fillers, including without limitation, kaolin clay, mica, silica, $TiO_2$, and other pigments.

The fiber-containing layer may contain vinyl and polymeric fillers.

A surface smoothness of the fiber-containing layer may be in the range of about 150 to about 200 Bekk seconds.

The fiber-containing layer may have an ash content from about 1% to about 40%.

The fiber-containing layer may have any or all the characteristics presented in the following table:

| | |
|---|---|
| Fiber Aspect Ratio (Average) | 5-100 |
| Fiber Thickness (Softwood) | 1.5-30 mm |
| Fiber Thickness (Hardwood) | 0.5-30 mm |
| Filled Fiber Content | 1% to 30% |
| Fiber Density | 0.3-0.7 g/cm$^2$ |
| Fiber Diameter | 16-42 microns |
| Fiber Coarseness | 16-42 mg/100 m |
| Fiber Pulp Types (Single- to Triple-Layered) | Mechanical, Thermo-Mechanical, Chemi-Thermo-Mechanical, and Chemical |
| Permeability | 0.1-110 m$^2$ × 10$^{15}$ |
| Hydrogen Ion Concentration | 4.5-10 |
| Tear Strength (Tappi 496, 402) | 56-250 |
| Tear Resistance (Tappi 414) | m49-250 |
| Moisture Content | 2%-18% by Weight |

The fiber-containing layer may have any or all the characteristics presented in the following table:

| Fiber Weight (lbs/3 msf) | g/m$^2$ | Tear Resistance (Mn) | Surface Roughness | Burst Strength (kPa) |
|---|---|---|---|---|
| 40-75 | 60-110 | 400-700 | 2.0-5.5 μm | 140-300 |
| 75 | 110-130 | 650-750 | 2.0-3.5 μm | 175-400 |
| 115 | 180-190 | 1400-1900 | 100-2500 mls/min | 175-475 |
| 130 | 205-215 | 1600-2200 | 100-2500 mls/min | 250-675 |
| 200 | 315-330 | 1900-3200 | 100-2500 mls/min | 500-950 |
| 300 | 460-195 | 500-4000 | 100-2500 mls/min | 700-1850 |

The mineral-containing layer may comprise a multilayer coextrusion, such as up to six layers, with each layer having from about 0% to about 70% by weight mineral content with a polymer bonding agent.

A weight of the overall composite may be from about 2.5 lbs/3 msf to about 150 lbs/3 msf.

The polymer bonding agent(s) of the mineral-containing layer may comprise linear, branched, and/or highly branched polymers.

The polymer bonding agent(s) of the mineral-contain layer may comprise polyolefin(s) having a number average molecular weight distributions (Mn) from about 5,500 to about 13,000, a weight average molecular weight (Mz) from about 170,000 to about 490,000, and/or a Z-average molecular weight (Mz) from about 170,000 to about 450,000.

The mineral-containing layer may have a Mw/Mn ratio from about 6.50 to about 9.50.

The mineral particles within the polymer matrix of the mineral-containing layer may be surface treated at levels from about 1.6 to about 3.5 mg surface agent/m$^2$ of the particle.

The mineral particles within the polymer matrix of the mineral-containing layer may have a particle top cut from about d98 of 4-15 microns and a surface area from about 3.3 m$^2$/g to about 10 m$^2$/g.

The mineral particles within the polymer matrix of the mineral-containing layer may comprise $CaCO_3$ coated with fatty acids having from about 8 to about 24 carbon atoms, with a surface treatment level from about 0.6% to about 1.5% by weight of the treatment, or from about 90% to about 99% by weight of the $CaCO_3$.

The mineral-containing layer may be from about 0.5 mil thick to about 5 mil thick.

Examples of non-fiber content in the fiber-containing layer include, but are not limited to, about 50-95% of #1 clay or #1 fine clay, about 3-20% by part calcined clay, about 3-40% by part $TiO_2$, about 2-45% vinyl acrylic, and from about 1% to about 35% protein binders, co-binders, or tribinders.

The mineral-containing layer may contain incremental quartz-silica content.

A process for recycling the present composite structure may have reject rates from about 10% to about 25% by weight of the starting composite, and screen plate efficiencies from about 60% to about 100%, with screen plates having the option of using hole, slotted, and contoured screens with one screen behind the other with an A plate having the smallest perforations, an intermediary B plate, and a C plate having the largest perforations, using processes including high density, forward, and through flow cleaners having a diameter from about 70 mm to about 400 mm and particle process out of fibers having reject rates of about 0.1% to about 30% and a particle removal efficiency from about 50% to 90% by mass, and particle sizes from about 150 microns to 0.05 microns.

A process for recycling the present composite structure may have feed-accept pressures in the range of about 2 kPa to about 12 kPa on smooth contoured and heavily contoured screens.

The present composite materials may have a pulper consistency from about 3% to about 30%, pulping temperatures from about 100° F. to about 200° F., pulping times from about 10 min. to about 60 min., with pulping pH from about 6 to about 9.5±0.5, and screen holes from about 0.050" to about 0.075" and slots from about 0.006" to about 0.020", drum pulping having an RPM from about 9 to about 20, having 4 mm to about 8 mm holes, with hole-type screens with holes from about 0.8 mm to about 1.5 mm in size, coarse to fine screen holes and slots from about 0.150 mm to about 2.8 mm, and screen rotor circumference speeds from about 10 m/s to about 30 m/s.

Certain of the present embodiments comprise a composite packaging structure. The composite packaging structure comprises a fiber-containing layer, and an outer layer bonded to the fiber-containing layer. The outer layer includes mineral particles in a matrix of a polymer bonding agent. The outer layer comprises from about 20% to about 70% by weight of the mineral particles. The outer layer has a density from about 1.05 g/cm3 to about 1.65 g/cm3, and a basis weight from about 4.5 lbs/3 msf to about 50 lbs/3 msf. The polymer bonding agent of the outer layer has a basis weight from about 1 lbs/3 msf to about 20 lbs/3 msf. The mineral particles may be evenly dispersed in the polymer matrix. The outer layer may be extruded. The outer layer may have a basis weight from about 7 lbs/3 msf to about 21 lbs/3 msf, and the polymer bonding agent of the outer layer has a basis weight from about 2.45 lbs/3 msf to about 16.8 lbs/3 msf. The mineral particles of the outer layer may comprise calcium carbonate. The polymer bonding agent of the outer layer may comprise polypropylene. The outer layer may comprise about 40% by weight of the calcium carbonate particles. The polymer bonding agent may have an isotactic run length from about 1 to about 40. The polymer bonding agent may have a shear rate from about 1 to about 10,000 at temperatures from about 180° C. to about 410° C. The outer layer may provide hot tack operating ranges from about 25° C. to about 225° C. having from about 1.0 N/mm to about 6.0 N/mm seal strengths. The polymer bonding agent may comprise a polyethylene copolymer, and the outer layer may provide hot tack operating ranges from about 80° C. to about 220° C. having from about 2.5 N/mm to about 15 N/mm seal strengths. The outer layer may be about 20% to about 40% mineralized, with a structure that is about 20% to about 60% amorphous and about 20% to about 55% crystalline. The outer layer may have a density from about 1.20 g/cm$^3$ to about 1.35 g/cm$^3$.

Certain of the present embodiments comprise a method of making a container from a sheet of a composite packaging structure. The sheet includes a fiber-containing layer and a mineral-containing layer. The method comprises cutting the sheet into a desired shape, folding the sheet to form a three-dimensional shape, and heat sealing abutting surfaces of the container to secure the abutting surfaces to one another. The heat sealing is performed under the following conditions: a dwell time in the range from about 0.30 seconds to about 15 seconds, a temperature range from about 115° C. to about 240° C., and a seal pressure at or below about 0.80 MPa. The folding may be performed manually or by machine. The three-dimensional shape may comprise a box having a bottom wall, one or more side walls, and a lid portion. The three-dimensional shape may comprise a container liner. The three-dimensional shape may comprise an envelope. The peel strengths between the heat sealed abutting surfaces may range from about 1 J/m$^2$ to about 45 J/m$^2$.

BRIEF DESCRIPTION OF THE DRAWINGS

The present embodiments now will be discussed in detail with an emphasis on highlighting the advantageous features. These embodiments depict the novel and non-obvious composite structures for packaging articles and related methods shown in the accompanying drawings, which are for illustrative purposes only. These drawings include the following figures, in which like numerals indicate like parts.

DETAILED DESCRIPTION

Figure 1:
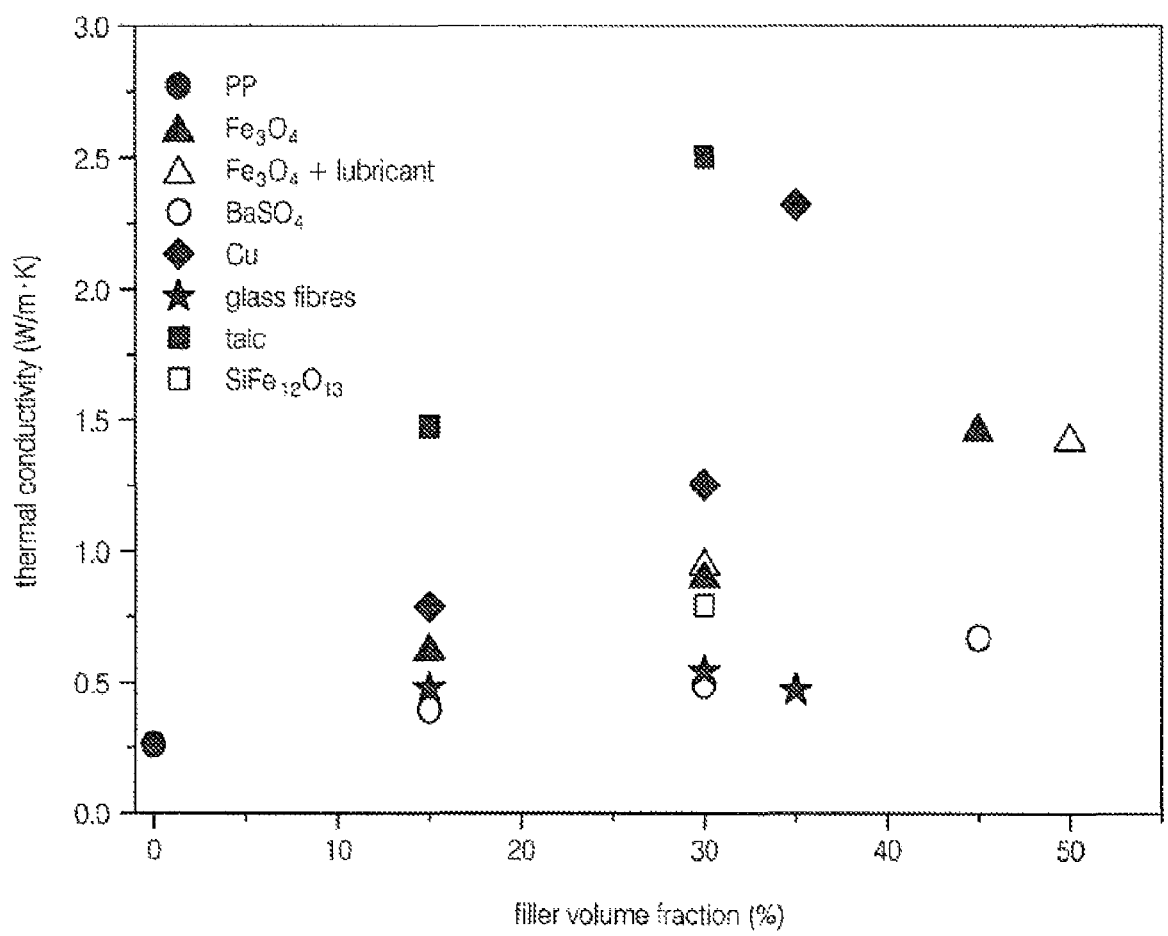
FIG. 1 is a graph illustrating the conductivity impact of filler loads.

When forming packaging that contains food products and dry goods, heat sealability is often important for closures. Also, the packaging structure preferably provides a barrier for moisture, oxygen, oils, and fatty acids. Other desirable characteristics include mechanical performance, aesthetics, cosmetics, resistance to chemicals, recyclability, heat sealability, surface energy, ink adhesion, ink wet-ability, film adhesion to fibers, improved surface for glue and adhesive application, and barrier performance (against oxygen, water, moisture, etc.). Therefore, extrusion coating fiber surfaces using polymers, (polyolefins being the most common) and bio-polymers is common practice. Various diatomaceous earth mineral fillers and pigments are generally used including mica, silica, clay, kaolin, calcium carbonate ($CaCO_3$), dolomite, and titanium dioxide to name a few. The fillers offer improved performance for barrier, opacity, increased stiffness, thermal conductivity, and strength. Fillers are normally less expensive than polymers and therefore a very economical component of the polymer layer. The most commonly used mineral fillers have densities in the range of 2.4 to 4.9 g/cm$^3$. Most polymers have densities in the range of 0.8 to 1.4 g/cm$^3$. Normally, the linear rule of mixtures can be used to predict the density of a composite from those of the constituents and their relative amounts, where Pc, Py, and P are the densities of the composite, filler, and polymer, respectively, and My is the mass fraction of the filler.

$$P_C = \frac{P_f P_p}{P_p M_f + P_f (1 - M_f)}$$

Filler particles can vary in size and shape. Size can vary from 0.1 micron to 10.0 micron mean particle size. An example of very fine mineral particles include nano-precipitated calcium carbonate which are less than 100 nanometers in size. Ultrafine nano particles can range from 0.06 microns to 0.15 microns. These ultrafine particles are useful for controlling rheological properties such as viscosity, sag, and slump. Mineral filler particles can have various shapes including e.g. spheres, rods, cubes, blocks, flakes, platelets, and irregular shapes of various proportions. The relationship between the particles' largest and smallest dimensions is known as aspect ratio. Together, aspect ratio and shape significantly impact the particles' effect in a composite polymer matrix. In yet other examples, particle hardness relates to coarseness, color to layer cosmetics and opacity. Particle morphology suited for the present embodiments are primarily, but not limited to, the cube and block shapes of salt and calcite having the characteristics shown in Table 1, below. Examples of cubic structures include calcite and feldspar. Examples of block structures include calcite, feldspar, silica, barite, and nephelite.

TABLE 1

Mineral Physical Properties

| | PARTICLE CLASS | |
|---|---|---|
| | CUBE | BLOCK |
| | Type | |
| | Cubic, Prismatic, Rhombohedral | Tabular, Prismatic, Pinacoid, Irregular |
| Aspect/Shape Ratios: | | |
| Length | ~1 | 1.4-4 |
| Width | ~1 | 1 |
| Thickness | ~1 | 1-<1 |
| Sedimentation | esd | esd |
| Surface Area Equivalence | 1.24 | 1.26-1.5 |

Mineral particles also often have higher specific gravity than polymers. Therefore, the density increases cost through elevated weight. Many particles are surface treated with fatty acids or other organic materials, such as stearic acid and other materials to improve polymer dispersion during compounding. Surface treatments also affect dry flow properties, reduce surface absorption, and alter processing characteristics. The specific gravity range potential of the minerals used in the present embodiments including pigments are from about 1.8 to about 4.85 g/cm$^3$.

It is advantageous to disperse fillers and pigments (which provide opacity and whiteness to the polymer composite) effectively in order to obtain good performance. For fillers, impact strength, gloss, and other properties are improved by good dispersion. For pigments, streaking indicates uneven dispersion, whereas a loss in tinting strength may be observed if the pigment is not fully de-agglomerated. Agglomerates act as flaws that can initiate crack formation and thus lower impact strength. In the present embodiments, agglomerates are preferably less than about 30 microns to preferably less than about 10 microns in size.

The thermal conductivity of the filler influences the processing of the polymer composite as well as the conductivity of the final material. In the present embodiments, the thermal conductivity of the mineral-containing composite layer applied to the fiber-containing layer is preferably in the range of about 0.02-3 WK$^{-1}$ m$^{-1}$, ±20%, an order of magnitude higher than for polymers.

A filled layer can be up to four times more conductive than polymer alone. For unfilled polymers, data from the rule of mixtures does not explain the outsized impact shown from actual data. Therefore, the level of filler content (see FIG. 1) has an outsized impact on the transfer of heat and processing during the composite's heating and cooling stages. Therefore, increased heat transfer rates readily impact mineral-containing extrudates and fiber adhesion during extrusion coating and the finished composite layer's downstream heat sealing characteristics.

Figure 2:
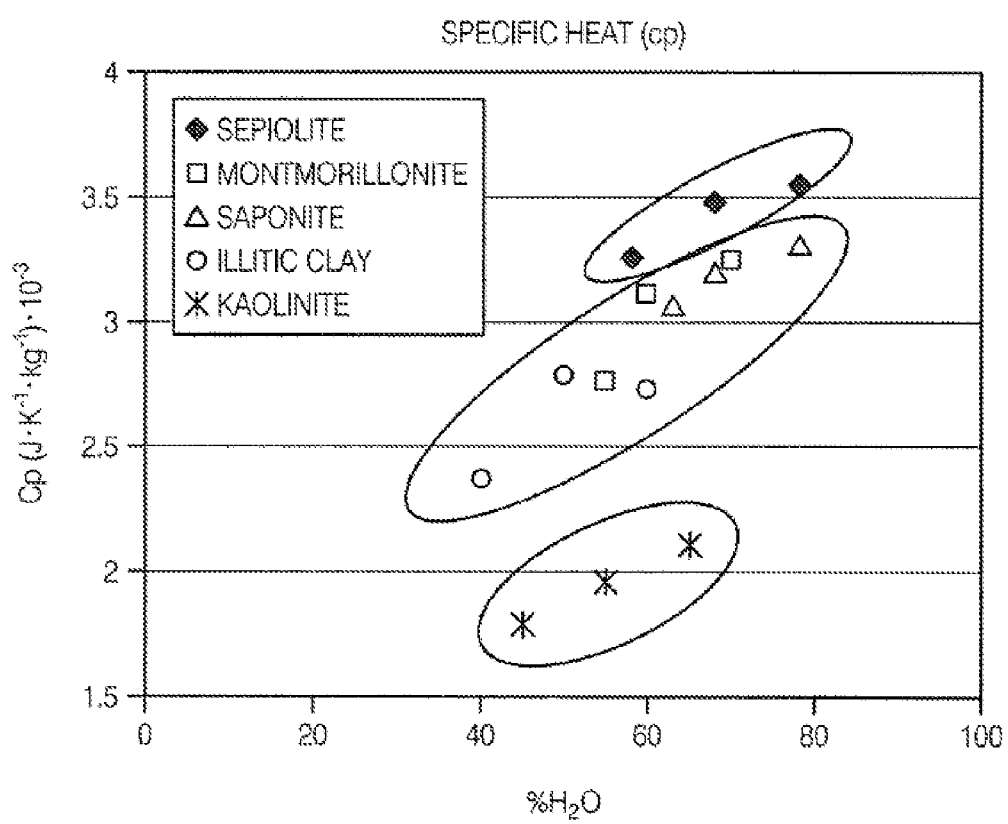
FIG. 2 is a graph illustrating the impact of water on specific heat values.

Thermal conductivity and specific heat can be combined to determine the heating rate of a composite layer. Specific heat is reported as the calories required to raise the temperature of 1 g of material by 1° C. Table 2, below, illustrates specific heat values for typical mineral fillers. Also, water content impacts specific heat as shown in FIG. 2.

TABLE 2

Specific Heat Values for Common Minerals and Mineral Fillers
1 Btu/lb$_m$ ° F. = 4186.8 J/kg K. = kcal/kg °C. and T (° C.) = 5/9[T (° F.) − 32]

| Product | Specific Heat cP (Btu/lb$_m$ ° F.) (kcal/kg ° C.) | (kJ/kg K.) | Product | Specific Heat cP (Btu/lb$_m$ ° F.) (kcal/kg ° C.) | (kJ/kg K.) | Product | Specific Heat cP (Btu/lb$_m$ ° F.) (kcal/kg ° C.) | (kJ/kg K.) |
|---|---|---|---|---|---|---|---|---|
| Calcite 32-100 F. | 0.19 | 0.8 | Cellulose | 0.37 | | Graphite | 0.17 | 0.71 |
| | | | Chalk | 0.22 | 0.9 | Gypsum | 0.26 | 1.09 |
| Calcite 32-212 F. | 0.2 | 0.84 | Cobalt | 0.11 | 0.46 | Fluorite | 0.22 | 0.92 |
| | | | Clay | 0.22 | 0.92 | Fluorspar | 0.21 | 0.88 |
| Calcium | 0.15 | 0.63 | Coke | 0.2 | 0.85 | Earth, dry | 0.3 | 1.26 |
| Calcium carbonate | 0.18 | | Diamond | 0.15 | 0.63 | Garnet | 0.18 | 0.75 |
| Calcium sulfate | 0.27 | | Dolomite rock | 0.22 | 0.92 | Glass | 0.2 | 0.84 |
| | | | Granite | 0.19 | 0.79 | Glass, crystal | 0.12 | 0.5 |
| Carbon, Diamond | 0.12 | 0.52 | Marble, mica | 0.21 | 0.88 | Mercury | 0.03 | 0.14 |
| Carbon, Graphite | 0.17 | 0.71 | Hematite | 0.16 | 0.67 | Mica | 0.12 | 0.5 |
| Carborundum | 0.16 | 0.67 | | | | | | |
| Limestone | 0.217 | 0.908 | | | | | | |
| Emery | | 0.96 | | | | | | |

Figure 3:
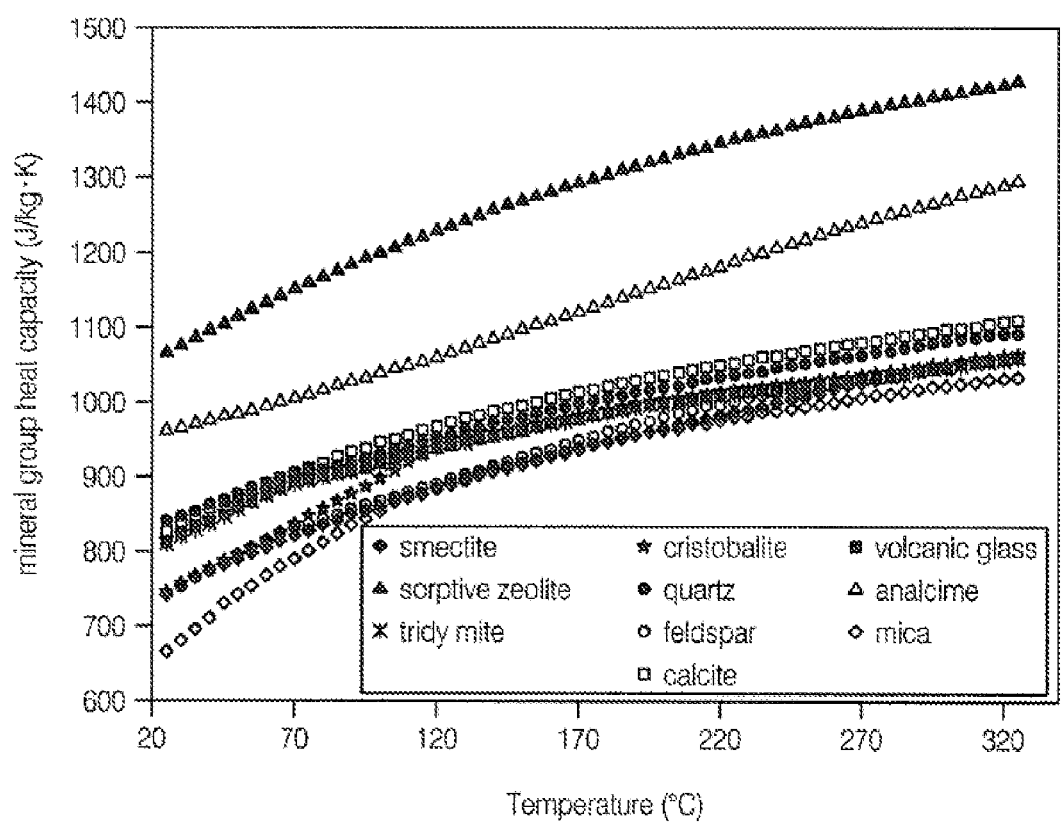
FIG. 3 is a graph illustrating the impact of temperature on heat capacity.

The sum of the heat capacities of the constituent elements of a compound provides an approximation of the calories per gram formula weight. FIG. 3 is an example of the relationship of temperature to heat capacity of selected mineral fillers.

Composites have changing thermal conductivities due to composition. Table 3 shows the preferred neat polymers heat conductivity based upon density within a range of about 0.11 to about 0.52 [W·m$^{-1}$·° K$^{-1}$].

TABLE 3

Example Neat Polymer Conductivity

| Polymer Density | Heat Conductivity |
|---|---|
| 0.934 to 0.956 g/cm³ | 0.33 to 0.052 |
| 0.908 to 0.925 g/cm³ | 0.25 to 0.33 |

Diffusivity of a material is a good indicator of the ability to raise its temperature and its ability to transfer heat throughout the heat seal process. Diffusivity=Thermal Conductivity/(Specific Heat×Density). The units in the SI system are $m^2/sec=W/(m·°K)+J/(kg·°K)×(kg/m^3)$. A relatively accurate average of each thermal property for the polymer and fillers can be determined by simple proportioning of the thermal properties to the mix percentage. As an example, a polypropylene ("PP") filled with 40% calcium carbonate has a diffusivity approximately 3.5 times greater than that of neat PP. Thus, the filled PP takes much less energy to facilitate equal transfer, and transfers energy much faster, than the neat PP in relation to the mass of the output, resulting in faster and greater thermal transfer than neat PP. Higher heat diffusivity and thermal transfer rate improve heat seal, peel strength, hot tack, and fiber tear.

Also, thermal transfer rates can accelerate and amplify the impact of pre-adhesion conditioning methods found in extrusion lines, particularly in advance of and during pre- and post-treatment, such as flame, corona, and plasma treatment. Thermal conductivity and temperature sensitivity sharply increase as mineral content increases, until it forms a continuous network or percolation threshold. Once a continuous network exists, added minerals have a rapidly diminishing impact. However, benefits remain, such as the reduction of polymer content, printability, adhesion, etc. The size and shape of the filler particles can help determine the amount of filler needed to reach percolation levels, with smaller, anisotropic fillers having a lower percolation threshold in most cases.

Often, primers are need during extrusion coating production to improve adhesion of the extrudate to fibers. However, because of improved adhesion characteristics during extrusion and later when the finished composite is used for downstream heat seal packaging forming, less of the primer may be required or possibly a less expensive formulation may be used having equal or better results. Advantageously, the primers may not be needed at all. Examples of such primers include Michem® Flex PI 883 water based heat seal primer. Further, use of the primers at the point of printing as a heat seal accelerant, e.g. before, during, or after rotogravure, offset, or flexo-printing, may be reduced or rendered unnecessary. Extrusion coating primers dry application weights can be from about 0.5 to about 20.0 g/m2. Example primer properties are, but are not limited to, density of about 0.55 to about 2.5 g/cc, a volatiles content from about 60% to about 90%, pH from about 7.5 to about 9.9, and Brookfield viscosities of from about 40 cP to about 500 cP.

Also, the mineral-containing layer can improve heat seal performance when heat and pressure are used to bond structures known as "blisters" or "clamshells" to fiber-containing compartments. Equipment used to make these types of packaging includes intermittent or continuous motion horizontal and vertical form-fill-seal equipment or molded pulp forming equipment. Further, mineral-containing thermoplastics and polyolefins can be used to coat single- and multi-layer lids and sealing layers inline to form thermoplastic compartments).

Typically, heat seal coatings as well as polyolefin coatings are applied to a fiber-containing or heat sealable layer such that the layer can be sealed to the thermoplastic surface, forming the packaging article. However, unique properties of the mineral-containing layer can be used to reduce or eliminate the need for polymer content in the finished packaging structures, or the coatings used to facilitate heat seals between surfaces. Examples of these include, but are not limited to, Aquaseal® 2277 and Aquaseal® 2105, both by Paramelt Company. The coatings are often applied on the paper or other surfaces during the converting process and before or after printing. The active ingredients are typically delivered through aqueous and emulsion solutions and mixtures, using an organic vehicle, for example, an alcohol or aromatic hydrocarbon such as xylene or a mixture thereof. Further, another example includes a liquid epoxy resin emulsified in a solution of the curing agent by stirring and the resultant solution dispersed with water to the desired coating, having solid dispersions from about 2% to about 60%. Another downstream product application might include single or multi-layer layers including labels, liners, or other aspects when such labels require heat, but not limited to heat processes, during manufacturing or during application. The label surfaces might include a range mineral-containing layers, polymer and fiber-containing materials and surfaces temporarily or permanently bonded to one or more inner or outer facing surfaces of the label structure before or after application to the product or products being applied.

Resin and composite extrudate sensitivity to heat becomes important during extrusion coating and extrusion lamination production. Small alterations during processing have an outsized impact upon pre- and post-extrusion results. Table 4 is a sample, but not limited to, extrusion coating production ranges for identified mineral-filled resins. In Table 4, the melt index measurements were stated under the guidelines of ASTM method D1238-04, and the density measured under the guidelines of ASTM standard method D1501-03.

TABLE 4

Operating Parameters, Mineralized Composite Resins, Monolayer, Coextrusion, and Multilayer Mineral-Containing Composites, to Fiber-Containing Layers

| ROLL ⇒ | Extruder #1 Monolayer | Extruder #2-#6 (coextrusion) or separate downstream units | Maximum ranges Plus & Minus as a % of stated value or stated value | Comments below do not represent limitations |
|---|---|---|---|---|
| RESIN SUPPLIER | Earth Coating | Earth Coating | | |
| GRADE NUMBER | Standridge Color TBD | Standridge Color TBD | | |
| MELT FLOW - Carrier Resin(s)/bonding agent | EST: 16 g/10 min. | EST: 16 g/10 min. | 4 g/10 min to 16 g/10 min | Interspersed and non-interspersed |

TABLE 4-continued

Operating Parameters, Mineralized Composite Resins, Monolayer, Coextrusion, and Multilayer Mineral-Containing Composites, to Fiber-Containing Layers

| | | | | |
|---|---|---|---|---|
| COMPOUND DENSITY | 1.25 g/cm³ | 1.25 g/cm³ | 1.01-4.90 g/cm³ | Molecular weight from ($M_2$ 150,00 to 300,000) |
| MINERAL CONTENT | 40% | 40% | General mineral content 15-60% by weight ±20% | Interspersed and non-interspersed |
| MELT TEMPERATURE | 590° F. (307° C.) | TBD | | |
| DESIRED BARREL PRESS. | 1500-2200 psi | TBD | 1200-2560 psi | From 1 to 6 extruders |
| Composite Melt Flow | 2-12 g/10 min | 2-12 g/10 min | 2 g/10 min-14 g/10 min | Interspersed and Non-Interspersed |
| Air Gap | 8" | 4"-12" | 4"-16" | |
| Die Gap | 0.025"-0.030" | 0.025"-0.040" | 0.020"-0.050" | From 1 to 6 Coextrusion |
| Monolayer and Coextrusion or separate downstream #2-#6 Co-layers | Initial Settings Barrel Zones | Maximum Adjustment Barrel Zones | Settings Die Zone | Maximum Adjustment Die Zone |
| TEMPERATURE SETTINGS | | | | |
| Melt Termperature | 590° F. | Up to ±25% | | |
| BARREL ZONE #1 | 405° F. | Up to ±35% | Die Zone 1 | 585° F. ± 25% |
| BARREL ZONE #2 | 540° F. | Up to ±35% | Die Zones 2-10 (as applicable to equipment) | 585° F. ± 25% |
| BARREL ZONE #3 | 575° F. | Up to ±35% | Die Zone 11 (as applicable to equipment) | 585° F. ± 35% |
| BARREL ZONE #4 | 590° F. | Up to ±35% | | |
| BARREL ZONE #5 | 590° F. | Up to ±35% | | |
| Other barrel Zones, if applicable on specific equipment | 590° F. | Up to ±35% | Other die zones if applicable | Up to ±35% |

Figure 4:
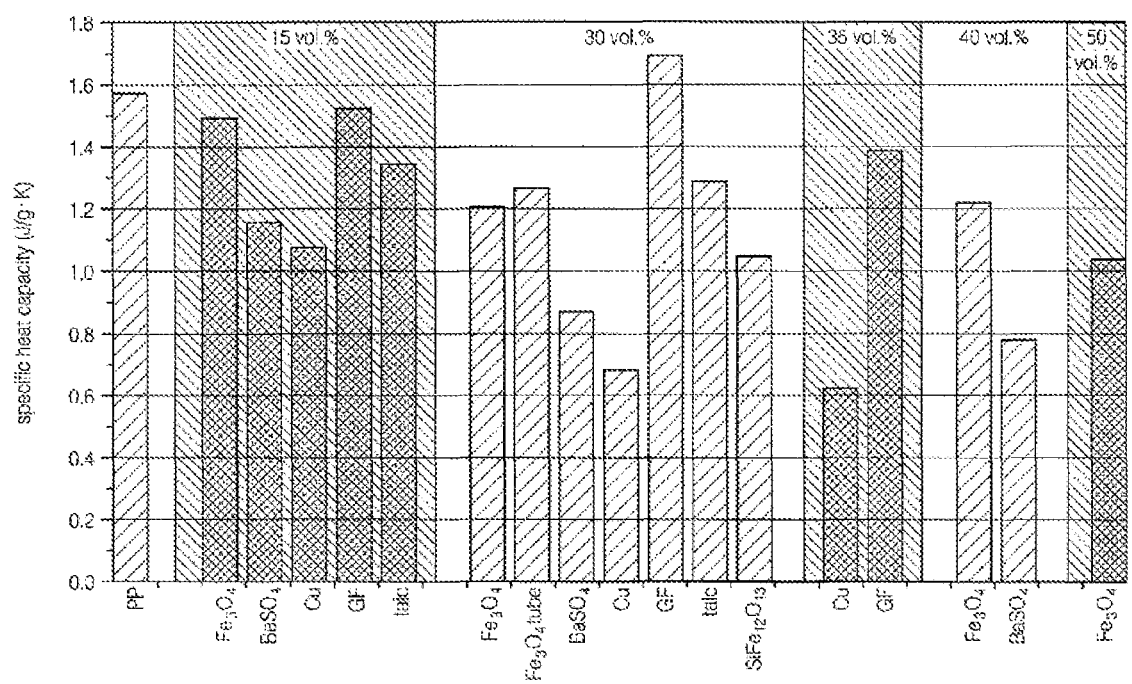
FIG. 4 is a graph illustrating polypropylene mineral composite specific heat capacities by filler load.

The heat capacity of the polymer composite represents the amount of energy required to heat up and cool down the material whereas the conductivity determines the speed of the heat transfer. It is possible to calculate the specific heat capacity for a composite using the linear rule of mixtures if the capacities of the two phases and their volume fractions are known. FIG. 4 shows selected specific heat values for mineral-filled polypropylene. Normally, units of $J \cdot L^{-1} K^{-1}$ are used to express specific heat capacity. For composites, however, this is not appropriate because one needs to know the heat capacity of a part whose volume is determined by the volume (not mass) of the polymer bonded through extrusion to the fiber surface. The volume specific heat capacities of mineral fillers in densities from about 1.95 to about 4.90 g/cm³ with particle distributions from about 0.75 micron to about 10 micron mean particle size (~1900-2600 $J \cdot L^{-1} K^{-1}$) are similar to those of polymers (~1500-3000 $J \cdot L^{-1} K^{-1}$), so fillers aid cooling in terms of speed of heat removal, but not through a reduction in heat capacity. Mineral particle size distribution also plays a role in thermal conductivity.

These attributes are key in adhesion of the polymer content to fiber and clay-coated fiber surfaces during extrusion production when the extrudate makes contact with the fiber surface. The filler has the capacity to absorb heat energy at approximately the same levels during shear and heating. However, its efficiency in discharging the heat proves invaluable for adhesion to fiber and clay-coated fiber surfaces as well as adhesion to flexible film surfaces. The estimated within ±10% preferred specific, but not limited to, heat ranges expressed in cal/g·° C. for selected minerals are: Calcium Carbonate 0.205, Kaolin 0.22, Talc 0.208, Mica 0.206, Feldspar 0.21, Wollastonite 0.24, Barite 0.11, and Silica 0.19.

Figure 5:
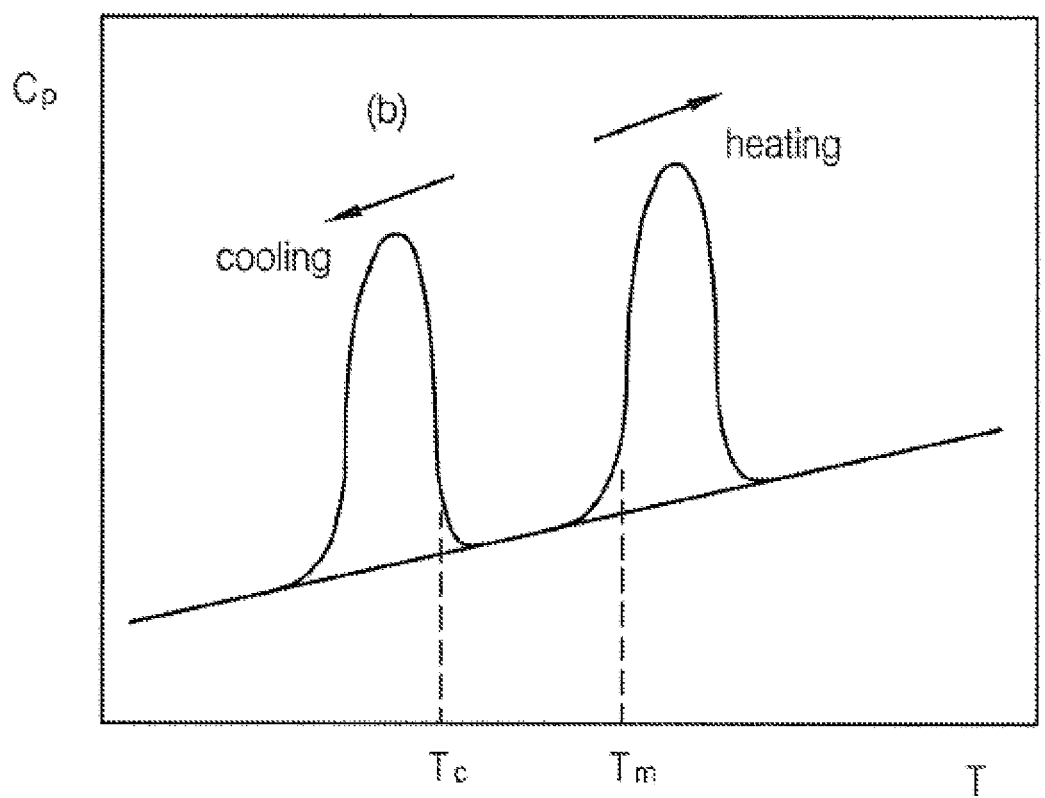
FIG. 5 is a schematic specific heat diagram for amorphous polymers.

A schematic specific-heat diagram for amorphous polymers is shown in FIG. 5. The inflection point corresponds to the glass-transition temperature, T. Typically, the variation in the specific-heat of amorphous materials can be about 50-70% between the processing temperature and room temperature.

Unlike amorphous polyolefins, a crystalline and semi-crystalline structure hysteresis is observed between the melting and the crystallization peaks, due to supercooling. Additionally, the crystallization process depends on the cooling rate, as the crystallization peak shifts to lower temperatures at higher cooling rates. These characteristics become critical aspects of mineralization affecting adhesion and the various amorphous-crystalline polymer mixes under mineral loads from about 20% to about 70% by weight of polymer mineral resin. This is particularly important in that functionally filled amorphous polymers and mixes of amorphous, crystalline, and semi-crystalline polymers have a comparable heat capacity. However, as mineralization filling occurs in the polymer matrix, the crystallization peak becomes highly efficient as heat is discharged earlier and more quickly. Using this effect, interspersed (polymers layered through coextrusion) or non-interspersed (monolayer) extrusion combinations can result in advantageous heat seal characteristics and at the same time use less polymer mass. Also, using functional minerals, hot tack performance can be improved by optimizing the mix of amorphous to highly crystalline polymers. Commonly available specific heat data are measured under a heating scan. The polymer, however, undergoes high cooling rate (quenching) during the extrusion process. While this will not affect the transitions of amorphous polymers significantly, the transition shifts for semi-crystalline materials can be dramatic. Upon mineralization, significant shifts could be seen in amorphous polymers.

Thermal conductivity is one of the most important properties for adhesion and heat seal performance. Similar to specific heat, thermal conductivity also exhibits variations from room temperature to processing temperature. Thermal conductivity, K, is reported as cal/cm·s·° C. Inorganic contents have values less than 1 to $8 \times 10^{-3}$ (±20%). Their constituent atoms are free to rotate and dissipate the effects of thermal energy, whereas fillers are rigidly fixed groups of atoms. Most polymers have a K of less than one order of magnitude than minerals. When these values are multiplied by density to obtain cal/cm³, the range for plastics and preferred fillers for the present embodiments ±20% are 0.35 (plastics) to 0.56 cal/cm³.

Figure 6:
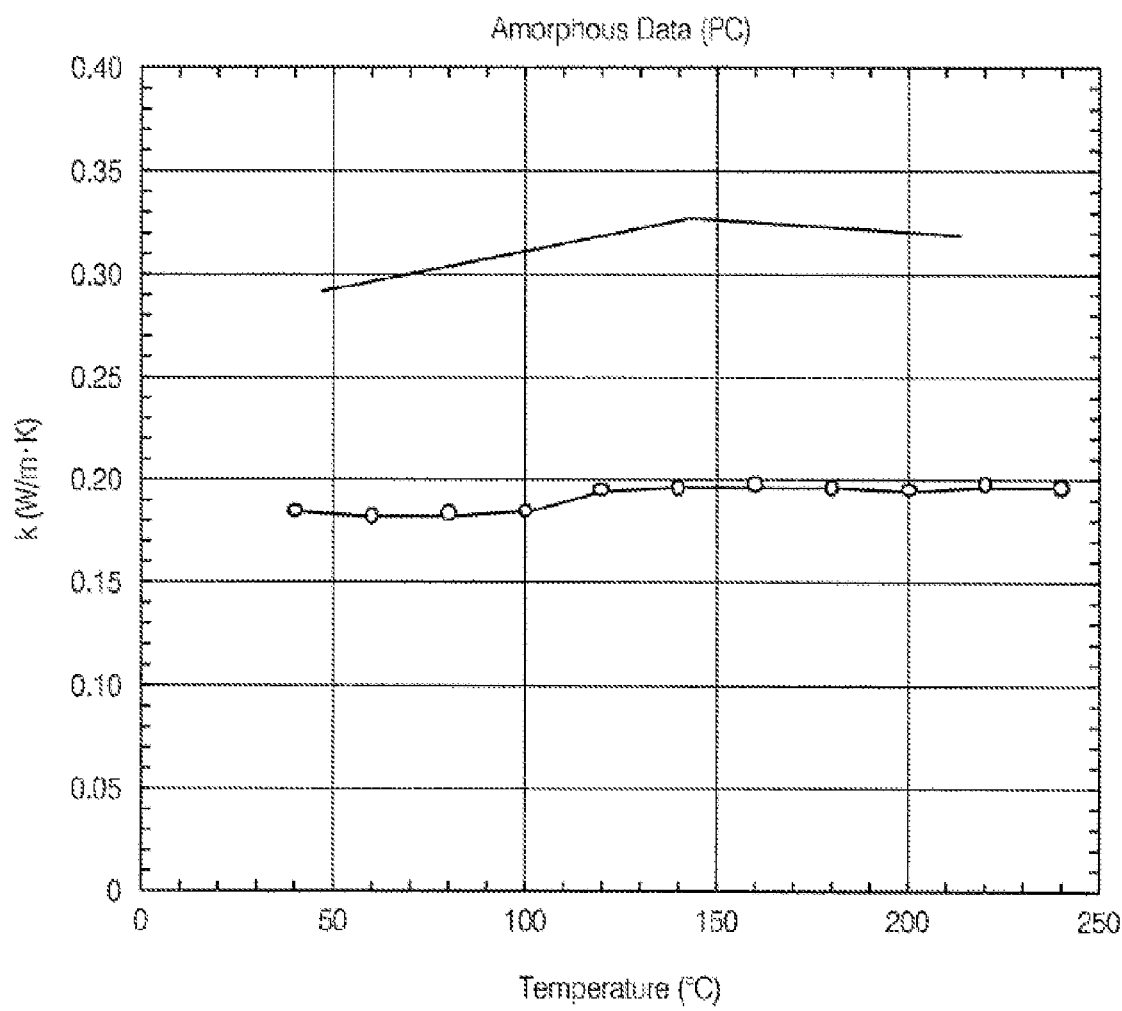
FIG. 6 is a thermal conductivity diagram for amorphous polymers.

Because mineralized polymer composites maintain sufficient levels of heat capacity, elevated thermal conductivity contributes to improved heat sealing and hot tack performance on monolayer and multilayer polyolefin-mineral composites to fiber surfaces, resulting in substantially improved peel strengths. Shown in FIG. 6 is a schematic thermal conductivity diagram for amorphous polymers. Thermal conductivity can increase approximately 1% to approximately 300% depending upon polymer type and mineral filler loads and filler type. Thermal conductivity consists of two regions in a piece-wise linear manner. Thermal conductivity remains constant when temperature is above Tg and decreases linearly when temperature is below T. The slope of the line below Tg is about 0.04 W/m·K per 100° C. and is reasonably universal to all pure, amorphous polymers. Thermal conductivity of functionally filled polymers, however, shows an abrupt increase when temperature drops below the crystallization temperature, Tc. This is because of the appearance of the crystalline phase, which creates regions of increasing high thermal conductivity, as shown by the arrow in FIG. 6.

Figure 7:
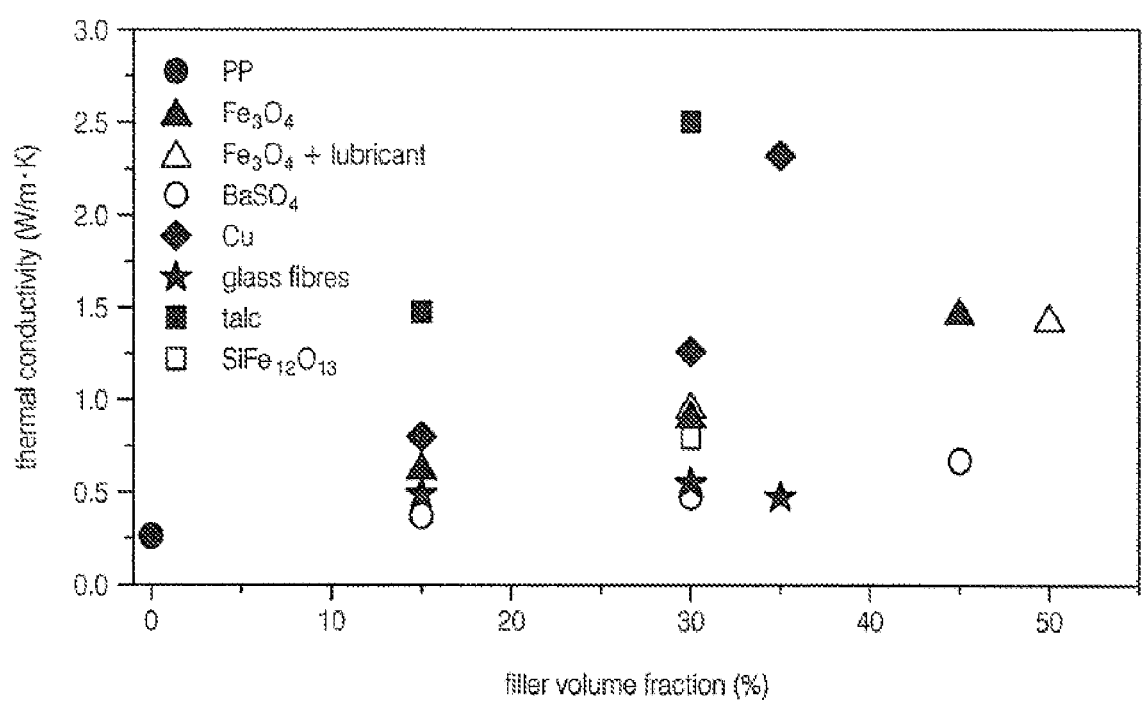
FIG. 7 is a graph illustrating thermal conductivity of mineral-filled polypropylene by volume of fill.

Functionally mineralized amorphous polymers can show an increase when temperature drops below the crystallization temperature. This characteristic impacts heat sealing and hot tack extrusion adhesion performance in amorphous and crystalline polymer mixes. In FIG. 6, the upper line represents estimated values for mineral containing resins. FIG. 7 shows the general relationship of selected filler at different volumes when added to polypropylene "PP." Further, FIG. 8 shows specific heat conductivity values of mineralized PP.

Figure 8:
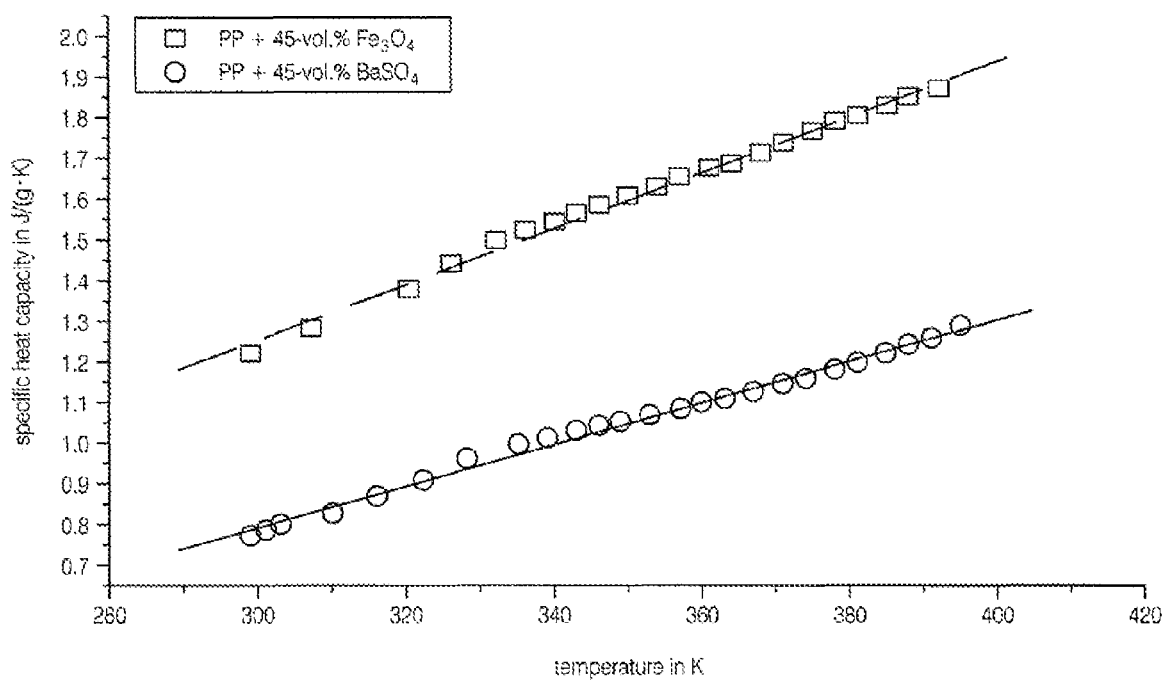
FIG. 8 is a graph illustrating specific heat conductivity of mineral-filled polypropylene.

FIG. 8 illustrates temperature dependence of the specific heat capacity of polypropylene filled with 45-vol % magnetite and barite. The symbols are measured values, the lines represent linear fits. Additionally, the previously stated characteristics provide the mineral-containing polymer composite to effect high performance heat sealing to other polymer and fiber surfaces using less by weight polymer mass to achieve functional heat seal tack and adhesion. Table 5, below, illustrates preferred polymer weight ranges, but not limited to, mineral composite extrudate providing combinations of one or more of fiber adhesion, fiber tear, heat seal, and heat seal tack.

TABLE 5

Polymer and Filler Mass for Composite Adhesion to Fibers and Heat Seal Tack

| Extrudate | Density (g/cm³) | Total Mass (lbs/3 msf) | Polymer Content (lbs/3 msf) |
|---|---|---|---|
| Neat Polymer | 0.88-0.98 | 3.5-50 | 3.5-50 |
| 20% to 65% Filled | 1.05-1.65 | 4.5-50 | 1.0-20.0 |

Interspersed (coextruded) and non-interspersed (monolayer) polymer layers effecting thermal transfer and thermal capacity when applied to fiber and clay-coated surfaces via extrusion coating therefore can result in far superior heat seal and adhesion performance, thereby lowering costs by reducing the total polymer content in the structure. Because polymers are considered a contaminant to paper recycling, other benefits include an improved environmental footprint through reduced polymer contamination content in the overall mixed material packaging structure, e.g. polymer and fiber construction, improving the potential for recyclability. The environmental impact of finished, converted, and printed packaging is an important aspect of manufacture. Generally, when polymers are used to coat fibers, the polymer content is considered a contaminant to the recycling process of the fiber substrate, rendering the packaging unrecyclable and unrecoverable. However, if the polymer content is sufficiently reduced as a percentage of the packaging structure, the packaging material may then be deemed recyclable by published standards known within the recycling industry. For example, one publication establishing such recycling standards is the Scrap Specification Circular, published annually by the trade group "Institute of Scrap Recycling." A commonly sought after qualification for paperboard recycling is the Residential Mixed Category, found on page 32 of the Circular. In order to achieve this standard, the percentage of polymer contamination should be below a certain level. Mineral fillers are not considered a contaminant. Therefore, increasing mineral content by weight provides improved recycling characteristics of the extrusion-coated paperboard.

However, as the amount of mineral content diminishes, machinability and resin stability during processing is affected. The present embodiments offer unique polymer composite structures and blends optimizing the mineral content and improving processing, greatly improving the recyclability of the finished packaging materials. Table 6, below, illustrates estimated fiberboard weight ranges, but not limited to, required to qualify for recyclability standards once the extrudate bonds to the fiber-containing surface during extrusion coating or extrusion lamination.

TABLE 6

Estimated Fiber Mass Required to Achieve ISRI Recycling Qualifications, Residential Mixed Category, When Polymer Composite Layer(s) are Combined with Natural Fibers

| Extrudate | Extrudate Mass (lbs/3 msf) | Polymer Content (lbs/3 msf) | Fiber Weight Required (lbs/3 msf) |
|---|---|---|---|
| Neat Polyolefin | 7-21 | 7-21 | >350 |
| 20% to 65% Filled | 7-21 | 2.45-16.8 | >120 |

Heat deflection temperature "HDT" can play a role in post-extrusion heat sealing of the polymer composite to fiber and clay-coated fiber surfaces. Further, HDT can effect adhesion and bonding of the extrudate onto the fiber surface during extrusion processing, which is a critical aspect of post extrusion performance. The HDT provides insights to the maximum temperature a material can withstand before it starts to deform under load. HDT increases with mineral fillers and the trends are similar for modulus.

Adding filler content increases HDT. The maximum HDT is for high loadings of high aspect ratio filler, as occurs at the temperature in which the polymer phase softens. This is very important as the polymer composite is softened upon contact with fibers during and right after extrusion and during the heat seal cycle at or near the heat seal activation temperature during specific dwell and compression settings. Novel resin blend combinations found in interspersed and non-interspersed polymer layers applied on fiber and clay-coated surfaces can result in far superior heat seal and fiber adhesion performance. For semi-crystalline polymers the maximum HDT is also for high loadings of anisotropic filler, but the limiting HDT is near the melting point of the polymers. For example, the HDT of PP homopolymer with a 20% filler load is 72° C. and up to approximately 82° C. from about 40% to about 50% by weight loading. This data is similar for polyolefins.

Most minerals have higher moduli than the polymer into which they are bonded. The mineral raises the modulus and the amount of stiffening depends on the volume percent of the filler and the shape of the particles. Usually modulus is plotted versus the weight percent of the filler.

The isotropic fillers such as calcium carbonate and dolomite give the least stiffening per unit volume added. Glass fibers, having the highest aspect ratio, offer the greatest stiffening. Particle size has no direct effect on the modulus of thermoplastics. The orientation of anisotropic fillers can change modulus, and high shear that occurs during extrusion orients the filler particles. Extruded composite polymer coatings having increased modulus can positively impact the mechanical attributes of the coating, providing increased heat seal performance at lower coat weights than non-filled polymer coatings. For example, the modulus of a PP homopolymers is 1.4 GPa. At 5% by weight of mineral filler load of $CaCO_3$ particles, the modulus increases to 1.8 GPa, at 10% filler load the modulus increases to 2.1 GPa, at 20% filler load the modulus increases to 2.5 GPa, and at 40% filler load the modulus increases to 3.1 GPa. Modulus could increase up to 4.5 GPa with mineral loads on or about 60%. Thermal expansion characteristics also play a role in polymer composite performance.

The coefficient of thermal expansion (CTE) represents the amount that a material expands or contracts with changes in temperature. A positive value indicates that the material expands when heated. The CTE may vary with temperature, but for the sake of this example, we will consider approximate values. The CTE for thermoplastics is usually in the range of $\sim 10 \times 10^{-5}$ mm$^2$/° C.±20%. This is approximately an order of magnitude more than for mineral fillers $\sim 10 \times 10^{-6}$ mm$^2$/° C. Also, the CTE can be reported as units per unit of linear dimensions per ° C. for a specified range of temperature. The CTE of cubical expansion is reported as the volume increase per unit volume of material per ° C. Most fillers expand differently in different directions owing to non-uniform composition or crystalline structure. CTE values for preferred inorganic fillers lie in the range of about 1 to $8 \times 10^{-6}$ in/in. The CTE has practical impact in that it predicts how much an extruded polymer coating will shrink upon cooling. Less shrinkage can result in improved adhesion to fiber surfaces and improved heat seal characteristics to an opposing polymer surface or heat sealing to form.

When using extrusion coating methods to bond the mineral containing layer to fibers, mineralized pellets are generally in the range, but not limited to, ⅛" long and ⅛" in diameter or less. The preferred extrusion coating adds significant costs and therefore the materials used are preferably inexpensive and provide the high performance. Increasing processing speeds and efficiencies is desirable. During the extrusion process, several steps are used to improve the printability, ink wet-ability, and adhesive bonding potential of the polymer surface. Primers are commonly used to improve the extrudate adhesion to fibers. The primers can be applied as a dispersion or as a solution. Yet another primer includes polyethyleneimine or "PEL" Mineral-containing polymer composites work well with primers including shellac, organic titanite, urethane, polyethylene imine, ethylene acrylic acid, and polyvinylidene chloride. Other primers include but are not limited to the reaction product of an epoxy resin and acidified aminoethylated vinyl polymer employed with glycidyl ethers of polyhydroxy compounds.

Mineral loaded polymer composites normally improve primer performance when applied from between 3 gsm (grams per square meter) to 20 gsm coat weights. Mineral loaded polymer composites can also heat seal to primed fiber surfaces during packaging production. This technique often mitigates the need for a polymer-to-polymer heat seal requirement, thus improving economics and the environmental footprint. Also, pre-heating of the fibers is common to improve the polymer adhesion to the fiber substrate as well as exposure to ozone. In addition to pre- and post-treating, polymer composite adhesion, bonding, fiber tear, and peel strength achieved after the extrudate makes contact with the fibers is a critical aspect of the extrusion coating process.

Another common practice is post-treating using corona or plasma treatment. The polymer layer increases in surface energy to improve ink wet-ability and ink adhesion as well as more favorable reaction when gluing, laminating, or adhering the polymer surface to another surface of the package. Yet another important polymer characteristic is the amount of dry friction on the surface of the polymer. Dry friction resists relative lateral motion of two solid surfaces in contact. Dry friction is subdivided into static friction, "stiction," between non-moving surfaces, and "kinetic" friction between two moving surfaces. The coefficient of friction (COF) is a dimensionless scalar value that describes the ratio of the force of friction between two bodies and the force pressing them together. COF ranges from near zero to greater than one. High COF is generally very useful for improved ink wet-ability and for gluing and adhesive results. Polymer surfaces such as polyethylene (PE) normally have a COF from 0.15 to 0.35. However, COF for mineralized polymer surfaces can be in the estimated range from about 0.18 to about 0.59. The higher number representing increased friction.

Some of the many benefits of neat, unfilled, polyolefin plastomers are favorable heat seal and optics characteristics in general. However, expensive additives with undesirable side effects are often required to provide machinability in filling operations. In filling, the lower the COF, the more easily handled the polymer surface during gluing, printing, and converting. As the polyolefin density decreases, optics and sealability improve, however, the film surface becomes tacky and the COF increases. However, functional mineral loadings can increase density and improve heat sealability without increasing the COF. Polyolefins are one group of resins used to form the film structure. Polyolefins are thermoplastic resins polymerized from petroleum based gases.

The two principal gases are ethylene and propylene. Ethylene is the raw material for making polyethylene (PE) and ethylene copolymer resins and propylene is the main ingredient for making polypropylene (PP) and propylene copolymer resins. Polyolefin resins are classified as thermoplastics, which means that they can be melted, solidified, and melted again. Mineralized polyolefin resins for extrusion coating are sold in translucent pellets and white pellets. Mineralized polymer resins sometimes contain additives, such as thermal stabilizers, or are compounded with colorants, antistatic agents, UV stabilizers, etc. The film structure of the present embodiments uses significant mineral filler content(s) interspersed within the film structure and found within one or more composite layers.

Polyolefin resins are a mixture of crystalline and amorphous structures. Amorphous polymers tend to shrink less on cooling than semi-crystalline polymers such as PE or PP. Due to the macromolecular structure of polymers, shrinkage can occur 24 to 48 hours after cooling. Because the CTE of fillers is far lower than for polymers, the addition of mineral fillers results in less shrinkage than the parent polymer combination. When the filler is combined with novel combinations of amorphous and semi-crystalline polymers, advantageous adhesion and heat seal characteristics emerge.

Molecular chains in crystalline areas are arranged somewhat parallel to each other. In amorphous areas they are random. This mixture of crystalline and amorphous regions is essential to the extrusion of good extrusion coatings. The crystals can act as a filler in the matrix, and so can mineralization, improving some mechanical properties. A totally amorphous polyolefin would be grease-like and have poor physical properties. A totally crystalline polymer would be very hard and brittle. HDPE resins have molecular chains with comparatively few side chain branches. Therefore, the chains are packed closely together. Polyethylene, polypropylene, and polyesters are semi-crystalline. The result is crystallinity up to 95%. LDPE resins have, generally, a crystallinity ranging from 60% to 75%, and LLDPE resins have crystallinity from 60% to 85%. Density ranges for extrusion coating resins include LDPE resins that range from 0.915 to 0.925 grams per cubic centimeter (g/cm$^3$), LLDPE resins have densities ranging from 0.910 to 0.940 g/cm$^3$, and MDPE resins have densities ranging from 0.926 to 0.940 g/cm$^3$. HDPE resins range from 0.941 to 0.955 g/cm$^3$. The density of PP resins range from 0.890 to 0.915 g/cm$^3$.

Addition of a mineral filler to the polymer results in a rise in viscosity. The addition of filler may also change the amount of crystallinity in the polymer. As polymer crystals are impermeable to low molecular weight species, an increase in crystallinity also results in improved barrier properties, through increased tortuosity. This effect is expected to be prevalent for fillers that induce a high degree of transcrystallinity. Some minerals can change the crystallization behavior of some thermoplastics and thus the properties of the polymer phase are not those of virgin material, providing novel characteristics during processing and in the performance of the finished composite structure. Thermoplastics crystallize in the cooling phase and solidify. Solidification for semi-crystalline polymers is largely due to the formation of crystals, creating stiffer regions surrounding the amorphous area of the polymer matrix. When used correctly, mineral fillers can act as nucleating agents, normally at higher temperatures. This process can provide mechanical properties in the polymer composite favorable to high barrier performance and adhesion to fiber surfaces without a detrimental effect on heat sealing characteristics. Minerals can begin to significantly effect crystallinity when used from about 15% to about 70% by weight of the polymer composite. Some of the factors influencing mechanical adhesion to paper include extrudate temperature, oxidation, and penetration into the fibers. Mineral onset temperatures of the polymer extrudate influence cooling rate upon die exit to the nip roller, which can be adjusted by the extruder air gap setting. Other key factors include the mass of the polymers of the polymer interface layer. The crystalline onset temperatures vary, however, examples are shown in Table 7, below.

TABLE 7

Selected Polymers with Estimated Mineral Onset Temperatures

| | |
|---|---|
| Unfilled Polypropylene | 120-122° C. |
| Calcium Carbonate | 120-125° C. |
| Dolomite | 120-131° C. |
| Talc | 120-134° C. |
| Silica | 120-122° C. |
| Mineral Fiber | 120-122° C. |
| Mica | 120-124° C. |

Further, homogeneous blends of solid olefin polymers with varying densities and melt indexes can be mixed within the mineral composite layer, either interspersed or non-interspersed through coextrusion. The mineral-containing composite layer can be applied and bonded substantially and continuously on at least a fiber-containing layer using extrusion or extrusion lamination, including blown film, cast, or extrusion coating methods. Polymer content of the mineral-containing layer can be used as a tie layer for interspersed and non-interspersed constructions as well as particle bonding agents within each individual layer. These bonding agents or tie layers can include individually, or in mixtures, polymers of monoolefins and diolefins, e.g. polypropylene, polyisobutylene, polybut-1-ene, poly-4-methylpent-1-ene, polyvinylcyclohexane, polyisoprene or polybutadiene, homogeneous metallocene copolymers, and polymers of cycloolefins, e.g. cyclopentene or norbornene, polyethylene, cross-linked polyethylene, ethylene oxide and high density polyethylene, medium molecular weight high density polyethylene, ultra heavy weight high density polyethylene, low density polyethylene, very low density polyethylene, ultra low density polyethylene; copolymers of monoolefins and diolefins with one another or with other vinyl monomers, e.g. ethylene/propylene copolymers, linear low density polyethylene, and blends thereof with low density polyethylene, propylene but-1-ene, copolymers ethylene, propylene/isobutylene copolymers, ethylene/but-1-ene copolymers, ethylene/hexane copolymers, ethylene/octene copolymers, ethylene/methylpentene copolymers, ethylene/octene copolymers, ethylene/vinylcyclohexane copolymers, ethylene/cycloolefin copolymers, COC, ethylene/1-olefin copolymers, the 1-olefin being produced in situ; propylene/butadiene copolymers, isobutylene/isoprene copolymers, ethylene/vinylcyclohexene copolymers, ethylene vinyl acetate copolymers, ethylene/alkyl methacrylate copolymers, ethylene/acrylic acid copolymers or ethylene/acrylic acid copolymers and salts thereof (ionomers) and tetrapolymers of ethylene with propylene and diene, such as, for example, hexadiene, dicyclopentadiene or ethylidenenorbornene; homopolymers and copolymers that may have any desired three dimensional structure (stereostructure), such as, for example, syndiotactic, isotactic, hemiisotactic or atactic stereoblock polymers are also possible; polystyrene, poly methylstyrene, poly alpha-methylstyrene, aromatic homopolymers and copolymers derived from vinylaromatic monomers, including styrene, alpha-methylstyrene, all isomers of vinyltoluene, in particular-vinyltoluene, all isomers of ethyl styrene, propylstyrene, vinylbiphenyl, vinylnaphthalene and blends thereof, homopolymers and copolymers of may have any desired three dimensional structure, including syndiotactic, isotatic, hemiisotactic or atactic, stereoblock polymers; copolymer, including the above mentioned vinylaromatic monomers and commoners selected from ethylene, propylene, dienes, nitriles, acids, maleic anhydrides, vinyl acetates and vinyl chlorides or acryloyl derivatives and mixtures thereof, for example styrene/butadiene, styrene/acrylonitrile, styrene/ethylene (interpolymers) styrene/alkylmethacrylate, styrene/butadiene/alkyl acrylate, styrene/butadiene/alkyl methacrylate, styrene/maleic anhydride, styrene copolymers; hydrogen saturated aromatic polymers derived from by saturation of said polymers, including polycyclohexylethylene; polymers derived from alpha, beta-unsaturated acids and derivatives; unsaturated monomers such as acrylonitrile/butadiene copolymers acrylate copolymers, halide copolymers and amines from acyl derivatives or acetals; copolymers with olefins, homopolymers and copolymers of cyclic ethers; polyamides and copolyamides derived from diamines and dicarboxylic acids and or from aminocarboxylic acids and corresponding lactams; polyesters and polyesters derived from dicarboxylic acids and diols and from hydroxycarboxylic acids or the corresponding lactones; blocked copolyetheresters derived from hydroxyl terminated polyethers; polyketones, polysulfones, polyethersulfones, and polyetherketones; cross-linked polymers derived from aldehydes on the one hand phenols, ureas, and melamines such as phenol/formaldehyde resins and cross-linked acrylic resins derived from substantial acrylates, e.g. epoxyacrylates, urethaneacrylates or polyesteracrylates and starch; polymers and copolymers of such materials as poly lactic acids and its copolymers, cellulose, polyhydroxy alkanoates, polycaprolactone, polybutylene succinate, polymers and copolymers of N-vinylpyrrolidone such as polyvinylpyrrolidone, and crosslinked polyvinylpyrrolidone, ethyl vinyl alcohol. More examples of thermoplastic polymers suitable for the mineral-containing composite include polypropylene, high density polyethylene combined with MS0825 Nanoreinforced POSS polypropylene, thermoplastic elastomers, thermoplastic vulcinates, polyvinylchloride, polylactic acid, virgin and recycled polyesters, cellulosics, polyamides, polycarbonate, polybutylene tereaphthylate, polyester elastomers, thermoplastic polyurethane, cyclic olefin copolymer; biodegradable polymers such as Cereplast-Polylactic acid, Purac-Lactide PLA, Nee Corp PLA, Mitsubishi Chemical Corp GS PLS resins, Natureworks LLC PLA, Cereplast-Biopropropylene, Spartech PLA Rejuven 8, resins made from starch, cellulose, polyhydroxy alkanoates, polycaprolactone, polybutylene succinate or combinations thereof, such as Ecoflex FBX 7011 and Ecovio L Resins from BASF, polyvinylchloride and recycled and reclaimed polyester such as Nodax biodegradable polyester by P & G.

The mineral-containing layer can include coupling agents from about 0.05% to about 15% of the weight of the mineral-containing layer. The agents aid in the mixing and the filling of the mineral into the polymer matrix. Functional coupling groups include (Pyro-) phosphato, Benzene sulfonyl and ethylene diamino. These can be added to thermoplastics including polyethylene, polypropylene, polyester, and ethyl vinyl alcohol, aluminate, siloxane, silane, amino, malic anhydride, vinyl and methacryl. The results of these combinations improve adhesion to fibers, heat seal strength, heat seal activation temperatures, surface energy, opacity, and cosmetics. Mineral content can include, but is not limited to, wollastonite, hydrated and non-hydrated, magnesium silicate, barium sulfate, barium ferrite, magnesium hydroxide, magnesium carbonate, aluminum trihydroxide, magnesium carbonate, aluminum trihydroxide, natural silica or sand, cristobalite, diaonite, novaculite, quartz tripoli clay calcined, muscovite, nepheliner-syenite, feldspar, calcium sulphate gypsum, terra alba, selenite, cristobalite, domite, siltonmica, hydratized aluminum silicates, coke, montmorillonite (MMT), attapulgite (AT) carbon black, pecan nut flour, cellulose particles, wood flour, fly ash, starch, Ti02 and other pigments, barium carbonate, terra alba, selenite, nephelinesyenite, muscavite, pectolite, chrysotile, borates, sulfacates, nano-particles of the above from 0.01 to 0.25 micron particle size, and precipitated and ground calcium carbonate. Among, but not limited, procedures generally involving the use of polymerization initiators of catalysts for the polymerization of butene-1 monomer to polymers of high molecular weight, preferably catalytic systems used in such procedures are the reaction products of metal alkyl compounds such as aluminum triethyl, and a heavy metal compound, such as the trihalide of Groups IV-VI metals of the periodic table, e.g. titanium, vanadium, chromium, zirconium, molybdenum and tungsten. The formation of polymers exhibiting substantial isotactic properties as wells as the variations in the molecular weight and the nature of the polymerization catalyst, coreactants, and reaction conditions. Suitable, but not limited to, isotatic polybutylenes are relatively rigid at normal temperatures but flow readily when heated, and they most preferably, should show good flow when heated, expressed in melt flow. Applicable isotatic polybutylenes should show a melt flow of from 0.1 to 500, preferably 0.2 to 300, more preferably from 0.4 to 40, most preferably 1 to 4. Other polymers expressed within the contents of the present specification should also be considered within these parameters.

Regarding the mineral-containing composite layer, upon substantially and continuously bonding to the fiber containing using extrusion coating or extrusion lamination techniques, the layer of which can then be used to form a laminated structure of which the mineral-containing layer can be used as a peel coat onto a desired backing material. The best peel seal, for example, to the mineral-containing layer of the composite, may be selected from poly-4-methyl pentene, nylon, high density polyethylene "HDPE," aluminum foil, polycarbonate polystyrene, polyurethane, polyvinyl chloride, polyester, polyacrylonitrile, polypropylene "PP," and paper. An example extrusion process can be accomplished with a screw or pneumatic tube. Sometimes the mineralized polymers can be combined with such materials as plasticizers lubricants, stabilizers, and colorants by means of Banbury mixers. The resulting mix is then extruded through rod shaped dies and chipped into pellets. Pelletized mineralized polymer can then enhance the mineral and other content by "letting down" the resin pellet mix with inline or offline mixing capability before being fed into the end of a, for example, screwtype extruder, heated, and mixed into a viscous fluid or semifluid in the extruder barrel for further processing to the die. Further, when properly dispersed the interaction between the mineral particles and the polymer content without covalent bonding, results in improved van der Waals forces that provide attraction between the materials. This interaction results in some adhesion in the composite during extrusion, resulting in an absorbed polymer layer on the filler surface.

The absorbed layer has restricted movement, and therefore has different properties than those surrounding the free polymer. The modified particle layer is called the "inter-phase." When using finer ground fillers with lower mean particle sizes, the effect of the inter-phase becomes significant enough to increase barrier performance because of the depth and frequency of the modified particles along the surface of the extruded polymer composite. The restricted polymer layer has less free volume than the bulk and this reduces permeability. The improved tortuosity can provide significant barrier performance improvements, as illustrated in various tables contained within this specification.

Heat sealing from fiber to polymer layer, from polymer layer to polymer layer, and heated polymer layers making contact with fiber layers during extrusion coating, are the most commonly used techniques for constructing packaging materials that are then heat sealed during package forming. Packages are formed after extrusion coating using different heat sealing technologies, such as ultrasonic welding, hot air welding, chemical adhesives, bar heat sealing, and impulse heat sealing. The molecular process that occurs during the heat sealing under compression or extrusion coating of a polymer layer to fibers, having semi-crystalline polymer content, is the interface between the polymer curtain or layer and fiber surface. Here, van der Waals forces arise in the contact area of the materials. These considerations combined with the unique attributes of the mineral content dispersed within the polymeric matrix of both monolayer and multilayer mineral composite layers impact the application of heat that initiates the melting of semi-crystalline polymers, causing the polymer molecules to better diffuse across the interface. Given sufficient time, the diffused polymer molecules and mineral content will become entangled with each other. The heat capacity of the mineral-containing layer is generally about the same as a neat polyolefin layer, accelerating fiber bonding at sufficient temperatures, particularly at very short dwell intervals with high heat levels, for example, using hot air sealing from about 0.23 second dwell and above and heat ranges from about 925° F. to about 1,100° F. Heat seal pressure requirements are generally less, but in the same range as, neat polyolefins from about 20 psi to about 80 psi.

Depending upon mass of mineralized polymer layer and percentage of mineral content by weight and other factors, heat seal activation temperatures range from about 350° F. to about 1100° F. With our without primers, during extrusion coating of either monolayer or multilayer mineral composite layers to fiber, 75% to 100% fiber tear measured by recognized industry in-process and post-production methods can be achieved with similar or less layer mass and polymer content. This effect is possible at extrusion line speeds up to about 1300 FPM, using semi-crystalline mineralized resin blends with extrusion equipment die and barrel zone temperatures from about 540° F. to about 615° F. Because of improved mineral thermal properties, oxidation of the extrudate upon exiting the die but before fiber contact improves about 10-50%, thus greatly strengthening fiber bonding characteristics under normal equipment operating conditions.

Because of unique structural properties, mineral dispersions greatly improve the polymer-containing matrix thermal transfer and heat diffusion properties. These characteristics provide outsized improvements on heat flow, heat seal activation temperatures, melt strength, inter-facial adhesion to fibers, interface bonding, hot tack strength, heat seal layer crystallization, and cooling. Therefore, peel strength upon fiber bonding during extrusion and heat seal is significantly higher than neat polyolefins. The mineral-containing layer's thermal and physical properties provide similar high performance characteristics when heat sealed during packaging formation including improved and enhanced re-crystallization, heat tack, and molecular inter-facial entanglements. These improvements are observed using a wide variety of heat sealing equipment that applies or transfers heat under pressure and time adjustments. Practical benefits include the reduction of plastic requirements during both heat seal to other surfaces and extrusion coating, for example, a polyethylene coated fiber surface might require from about 7.2 lbs/3 msf to about 20 lbs/3 msf coat weight on one or more sides for adequate fiber tear during extrusion and sufficient post-cooling peel strength during packaging formation. However, from about 20% to about 65% mineral-containing layer can improve fiber bonding and heat seal characteristics with coat weights from about 6.5 lbs/3 msf to about 12 lbs/3 msf and above. In many cases, an existing two side polyolefin-coated fiber composite can be extrusion bonded or heat sealed at similar or better performance using total polymer content on either one or both sides of the fiber-containing layer up to about 40%-65% or less, reducing the resin cost per pound of the layer. Additionally, the mineral-containing composite layer is well suited for adhesion for medical packaging, although not limited to medical related packaging, during radiation sterilization. Particularly related to widely employed types of radiation such as gamma (cobalt 60 particles) and electron beam ($\beta$ particles). Electron beam is typically used for less dense materials from the shallower penetration depth of the lower energy $\beta$ particles. Radiation sterilization does not require porous packaging materials and is frequently the sterilization method chosen when a barrier to gas penetration is a requirement of the medical device.

However, radiation is frequently employed with permeable package types if the packaging material properties will not be compromised during treatment. Stream autoclave sterilization requires high barrier, higher molecular weight, thermally stable materials, such as polypropylene or polycarbonate, making mineralization of the mineral-containing composite layer an excellent improvement in cost and performance, particularly when heat sealing peel strength are important factors in the packaging characteristics as well as reducing or eliminating the need for heat seal coatings. One standard used to measure heat seal strength includes ASTM F88-94. Mineral-containing composite layers can be used to achieve heat seal strength in medical applications from about 0.5 to about 5 lbs per inch of seal width.

Also, due at least in part to the thermal characteristics of the mineral content, the mineral-containing layer mineralization can improve the available bonding sites and increase the internal cohesive splitting between polymer content of numerous sealable structures, e.g. relatively incompatible materials, such as polyethylene and polybutylene layers as a result of, among other things, improved interfacial adhesion.

Polymer melting is a key characteristic in the process. The reptation model has been widely used to explain the inter-diffusion of polymers during melting. The reptation theory can be used to model the motion of an individual chain molecule during melting. According to the standard reputation theory, a polymer chain is confined to a tube that represents the topological constraints arising from chain entanglements. The thermal energy causes molecular movements to occur during melting. With the application of heat, the polymer molecules absorb heat energy and the chain ends entangle. Upon mineralizing selected polymer layer composites from about 20% to about 65%, the polymer chains diffuse more rapidly across the interface at wider temperature ranges and behave similar to higher molecular weight layers, weight high crystallinity, and less branching. Therefore, diffusing across the interface at wider ranges of the interface temperatures, resulting in strong peel strength heat seal results. In part, this strong seal is attributed to an increase in entanglement density in the sealing area. The entanglements can be considered to be a temporary intermolecular interaction between long chain molecules, not preventing the material from flowing under shearing stress. For example, CaCO3 particles facilitate polymer crystallization entropy with increasing percentage of weight and volume in the polymer, with cooling rates, as an example, from about 1.5 to about 4.5° K/min, thus having impact on differential scanning calorimetry (DSC) curves. Further, because mineral content accelerates diffusivity in the polymer melt, cooling times are truncated during the early and later stages of the hot tack cycle, greatly improving early and subsequent extrusion and heat seal adhesion—T Dot Peel Strength performance. This effect is also seen during extrusion coating mineral loaded extrudates to fiber-containing surfaces. For example, Diffusivity=Thermal Conductivity (Specific Heat×Density), $m^2/sec=W(m° K+J(kg° K)×(kg/m^3)$. This characteristic combined with thermal bulk also lowers the requirement of polymer content in the mineral containing layer up to 30-70% by weight of the layer. A further example includes polypropylene "PP" 40% filled by $CaCO_3$ would have heat diffusivity 3.5 times greater than that of neat PP. This means it will take much less thermal energy during the heat seal and extrusion coating process and also the cooling time of the melt is reduced increasing hot tack and delivering efficient and effective crystallization and interfacial bonding of the melt to fiber-containing and other type layers. Mineral loading of the polymer content can therefore decrease heating and cooling properties of neat or lightly filled (less than 20% by weight) polymer layers from about 1 to about 6 orders of magnitude depending up the polymer mix, type of minerals used, and rate of heat exposure.

Therefore, these mineral-enhanced entanglements can act as a topological barrier to the movement of the polymer molecules. The entanglement process that occurs during the melting of polymer molecules has been modeled by considering entanglements as sliding contacts in a polymer matrix, showing that the elastic modulus in the rubbery state of melt is related to the entanglement density. Mineralization within the polymer layers with specific gravities in the range of from about 1.19 to about 1.62 $g/cm^3$ alters the end state performance of these effects. The average molecular weight between entanglements (Me) relates to the shear modulus in the rubbery plateau region of the polymer (as observed in the graph of log (shear stress) verses (log time)), Me is inversely related to the entanglement density, where T is absolute temperature, R is the gas constant, and D is the density. This equation is valid only for the polymer in which chain entanglements are distributed homogeneously.

Among the processing parameters and considerations impacting mineralization of selected polymers for optimum adhesion to fibers during extrusion of the mineral containing layer to the fiber-containing layer as well as heat seal performance of the finished mineral-containing packaging composite surfaces to other surfaces, both polymer and fibrous, during production of the packaging article, temperature plays an important role during heat sealing and during extrusion coating. In many sealing applications, the heat flux must be high enough to melt the polymer films. The energy required to achieve an optimal seal, that is usually evaluated by seal strength, is dictated by the material and thermal properties of the film in combination with novel thermal and physical characteristics of the mineral content combining in part with the thickness of the mineral-containing layer, crystallinity, thermal diffusivity, melting point, contact resistance of the mineral-containing layer, etc.

The amorphous fraction of the polymer layer can be related to temperature and heat transfer, thus, mineralization can improve ultimate bonding strength. The energy required to achieve an optimal seal, that is usually evaluated by seal strength, in part is dictated by the material and thermal properties of the polymer layer once modified through mineralization, including thickness, crystallinity, thermal diffusivity, heat conductivity, heat capacity, melting point, contact resistance, etc. The maximum heat seal strength occurs when temperature completely melts crystalline regions of the polymer films. The mineral particle content thermal properties accelerates crystalline melt and also shortens hot tack intervals achieving maximum pre-cooling peel strength.

The strength of all heat seals formed by hot die sealing behaves in broadly the same way, e.g. the hot seal is initially relatively weak at the conclusion of the heat seal cycle, however, as the seal cools it gains strength at very high speeds. In seconds or less, the seal reaches ambient temperature and its terminal strength. The term "hot tack" refers to the strength of the hot seal during approximately the first 500 to 1,000 milliseconds after peak heat application to sealed surfaces. Thus hot tack is measured prior to hardening or recrystallization of the sealant polymers. The seal itself changes strength rapidly during the cooling process, starting at millisecond zero. Hot tack is a variable that is a function of both time and ambient cooling conditions, thus affecting heat transfer from the seal to the surrounding environment.

Thermal aspects of the sealed surfaces including heat capacity, rate of heat transfer, and rate of crystallization, are critical to forming a functional seal with adequate peel strength and fiber tear. Hot tack performance can be described by a curve of seal strength vs. seal temperature or, otherwise stated, the cooling curve of the material. The curve of hot seal strength vs. cooling time portrays the tack behavior of a material graphically. Mineralized polymers can improve self adhesion above the melt temperature due to the thermal attributes of the mineral content, both in heterogeneous and homogeneous ethylene copolymers. Also, mineralization can provide superior performance without the need for extensive surface separation of the lower molecular weight and higher branch content. Improved self adhesion in the melt due to advanced thermal kinetics of about 20% to 65% mineralized layers improve the ultimate adhesion and peel strength of the heat seal bond as well as bonding efficiencies during the machining process as the melt cools. Normally, these characteristics are highly dependent upon branching, however, mineralization can extend high performance tack along a wider range of polydispersed and heterogeneous materials through improved inter-diffusion rates among a more dispersed range of polymer densities. These advantages are also notable when extruding various polymeric blends during extrudate heating and contact and binding to fibers, resulting in improved tack, adhesion, and the subsequent heat sealing process when forming the packaging article(s). Molecular weight ranges of the polymer bonding agent content of the mineral-containing layer from about Mw 10,000 to about 100,000. Further, having, but not limited to, a minimum of about 10%-70% of the polymer content having branching index (g') of about 0.99 or less measured at the Z-average molecular (Mz) of the polymer. Some part or all of the mineral-containing layer polymer bonding agent is preferred but not required to a have an isotactic run length from about 1 to about 40. Further, the mineral containing layer polymer bonding content shear rate range is from about 1-10,000 at temperatures from about 180° C. to about 410° C. The mineral-containing composite layer, having mineral content from about 20% to about 65% (but not limited to), can generally provide hot tack operating ranges from about 25° C. to about 225° C. having from about 1.0 N/mm to about 6.0 N/mm seal strengths. Using polyethylene copolymers, with temperatures from about 80° C. to about 220° C. and having hot tack strength from about 2.5 N/mm to about 15 N/mm with optimal strength in the range of about 120° C. to about 160° C. Additionally, mineral-containing dispersed and non-interspersed polymer layer peel strengths having ranges represented in J/m² from about 1 to about 45, having sealing (dwell) times in the range from about 0.30 seconds to about 15 seconds, in temperature ranges from about 115° C. to about 240° C. with corresponding seal pressures at or below about 0.80 MPa.

Further, extrusion coated mineral-containing resins can be bonded substantially and continuously with excellent fiber tear in time frames from about 0.01 seconds to about 6.0 seconds, with an initial extrudate contact time of from about 250 to about 2,500 milliseconds and temperature ranges from about 490° F. to approximately 635° F., at contact pressure. Embodiments of the present bonded mineral-containing layer, at the point of post crystallization and beyond the rubbery zone, have a Dot T-Peel strength measured by ASTM D 1876 of from about 5 to about 450 J/m² up to 75% to 100% fiber tear observed within the damage and fracture zone. Results using 20% to 70% (by weight) mineral-containing extrudate were from about 0.5 lbs per thousand square feet (msf) to about 20 lbs per msf. The low polymer mass requirements resulted in part to mineralizing low molecular weight polymers having some amorphous polymer structure at the layer interface. Since seal strength curves for most materials are generally of the same shape, an index number related to the rate of the increase of seal strength with cooling can be used if the cooling-time curve is followed to the point of ambient temperature, and then leveling off at the terminal seal strength. The terminal seal strength is measured by the peel test on a tensile machine. This measurement can be taken minutes, hours, or days after ambient temperature is reached. Prior to measurement, the seal pressure is preferably sufficient to flatten the tested sample to the point at which maximum molecular contact is made between the two surfaces, as heat sealing and extrusion coating extrudates to fiber involves diffusion of chain ends from each surface into each other.

Also, sufficient dwell time is preferably allowed to permit the interface to reach the known temperature of the heat sealing method. For coating and films up to about 3.0 mils, 100-250 milliseconds (ms) is sufficient. During production, for efficiency, short dwell time is advantageous. Therefore, enough heat is preferably applied and tack is preferably present as soon as possible to keep the initial package integrity sufficient enough to maintain a seal as the cooling process continues.

High mineral content provides very fast thermal conductivity and diffusion. Thus, tack is formed more quickly and with higher strength. Also, the optimum heat threshold is achieved sooner, e.g. crystallization temperature, further offering faster heat seal integrity during the production process. The ability of an adhesive or polymer coating layer to resist creep of the seal while it is still warm or in a molten state is called hot tack. Hot tack includes two components, the melt strength of the seal layer at the temperature of the seal, and the interfacial adhesion of the sealant layer. Table 8, below, illustrates the heat seal tack improvement of mineralized resins according to the present embodiments (Film A) vs. neat polyolefins (Film B).

TABLE 8

Hot Tack Performance (ASTM F-1921)

| Interface Temperature | Observations - N/25 mm @ 250 MS | | | Mean N | Std. Dev. N |
|---|---|---|---|---|---|
| FILM A: 20%-40% Mineralized, 20%-60% Amorphous, 20%-55% Crystalline Structure | | | | | |
| 105 | 0.19 | 0.16 | 0.22 | 0.19 | 0.03 |
| 110 | 1.68 | 1.68 | 1.68 | 1.68 | 0.0 |
| 115 | 2.25 | 2.25 | 2.31 | 2.27 | 0.03 |
| 120 | 1.95 | 1.76 | 1.63 | 1.78 | 0.16 |
| 125 | 0.95 | 1.25 | 1.17 | 1.12 | 0.16 |
| FILM B: 100% Neat, No Mineral Load | | | | | |
| 105 | 0.19 | 0.19 | 0.22 | 0.20 | 0.02 |
| 110 | 0.76 | 0.79 | 0.62 | 0.72 | 0.09 |
| 115 | 1.19 | 1.49 | 1.49 | 1.39 | 0.17 |
| 120 | 0.54 | 0.43 | 0.52 | 0.50 | 0.06 |
| 125 | 0.46 | 0.41 | 0.65 | 0.51 | 0.13 |

Note:
Mineralized resin density is 1.20 to 1.35 g/cm³

At an interface of from about 155° C. to 120° C., mineralization is projected to improve the performance from about 15% to about 70%.

Heat sealing of a polymer is a combination of mass and heat transfer processes. Heat flow to the polymer films, the melting of the polymer, and the inter-diffusion of molten polymer chains are time relevant. In order to form a strong, intact seal, an adequate dwell time, or the duration of time when the films make contact together during sealing, must be given to allow the mass and heat transfer processes to proceed until the target end conditions are reached, e.g., complete melting of crystalline fraction to obtain crystal fusion using, for example, random copolymers with densities at or above 0.88 g/cm³ and adequate inter-diffusion of molten polymers to form a continuum interface. Potential, but not limited to, copolymer isotacticity index from about 20% to about 85% measured by the DSC method can be used, and as such mineral-containing layers with mineral by weight concentrations up to about 75% having a melt flow index "MFI" from about 190 g/10 minutes to about 1.0 g/10 minutes measured by the NFT 51-620 standard can be obtained. The addition of polyolefin plastomers and elastomers having the densities per ASTM D 792 from about 0.86 to about 0.891 g/cm³ with DSC melting peaks from about 59° C. to about 110° C. can be considered having a 2% secant modulus, and MPa from about 15 to about 120. The optimal dwell time interacts strongly with temperature; the application of higher temperatures reduces the time required for polymer layers and vice versa. Mineralization alters the specific heat of the mineralized polymer layer, thermal diffusion, and heat conductivity. Therefore, upon heat capacity apex, dwell time and pressure requirements can significantly diminish. At the same time, a high performance bond takes place along the fiber-containing layer contact surface. For example, increasing the dwell time from 0.3 to 1.4 s at a 130° C. temperature during heat sealing 12 lbs/3 msf layer of PE increased seal strength by only 10%. However, a 25% to 65% mineralized polyolefin layer increased peel strength from about 20-30% with dwell times of about 0.4 to 0.9 seconds with a 9 lbs/3 msf layer weight. Therefore, dwell time during heat seal can contract, however, it is still considered to be a secondary factor compared to temperature. High temperature sealing methods can be employed such as hot air with seal temperatures from about 650° C. to about 1200° C. having nominal seal pressures below about 30 psi and dwell times of below about 2 seconds. Molecular contact between two surfaces is necessary in order to allow the diffusion of polymer chains across the seal or contact interface. Pressure applied to mineral-containing layers during the sealing process can be from about 5 psi to about 90 psi. This contact can be established by compressing the polymer films together or to fiber surfaces, under compression pressure. The applied pressure helps to remove surface irregularities and to increase the actual contact area between the sealed surface interface, thereby increasing heat flow. However, the mineralized layer can provide greater heat flow efficiencies, thus reducing dependence on pressure. The plateau initiation temperature is when the interface temperature is high enough to melt the crystalline region of the polymer completely. Other than pressure required to accomplish efficient surface area contact between the sealing surfaces, the effect of pressure on heat sealing can be considered a less important variable when using mineralized layers vs. polyolefin layers. Mineralization improves the critical inter-diffusion process of polymer molecules.

The interface temperature between the two sealing surfaces plays an important role governing the seal initiation temperature. The seal initiation temperature is dependent on the amorphous fraction of the polymer. For example, the seal initiation temperature for polyethylene is determined when the amorphous fraction reaches about 60-85%. However, because of mineral particle thermal properties, the amorphous fraction can be extended to about 40% to about 85%. The plateau initiation temperature is determined to be when the interface temperature is high enough to melt the crystalline region of the polymer completely.

For example, reviewing the heat sealability of mineral-containing layers bonded to fiber-containing layers provides failure modes including: peeling, delamination, and tearing. The peeling mode is when the sealing temperature is lower than the melting point of the polymers. When combining the peeling and delaminating failure modes, the interface temperature is below the final melting point of the polymer, resulting in incomplete melting of crystallites. However, mineralization helps improve performance through stabilization of the interface layer during temperature changes. When the interface temperature reaches the plateau initiation temperature, the seal strength increases, and delaminating or tearing failure modes or a combination of these phenomena are commonly observed. The delaminating failure mode occurs due to the weak bonding between the laminate layers.

The peeling failure mode is generally correlated with low heat seal strength due to low entanglement density in the sealing areas, while tearing mode or fiber tear is associated with the highest seal strength. In the latter failure mode, the strength of the seal is higher than the cohesive strength of the polymer indicating production of an ideal seal and adhesion. The heat seal failure mode is dependent on the material type, laminate structure, and the surface properties of the seal substrate. For instance, two failure modes during heat sealing is an example, namely fractures in the seal and at the edge of the seal, and necking behavior at the edge of the seal related to the peeling failure mode. Corona discharge treatment, which is commonly applied to increase surface activity of polymer films to improve printability, can create cross-links on the film surface that reduce the inter-diffusion of polymer chains, thereby changing the failure mode of the material. The observed difference due to the reduction in entanglement density in the sealing area is caused by the corona discharge treatment. However, particle mineralization of the polyolefin can reduce or mitigate the adverse effect of corona treat to the surface of the mineral-containing layer.

In general, heat transfer can be defined as a transfer of heat energy due to the presence of a temperature gradient in a medium, causing the transfer of heat energy from high to low temperature. Conduction heat transfer is the main mode of heat transfer involved in heat sealing. Conduction heat transfer occurs when more energetic molecules that are at a higher temperature share their energy with less energetic molecules in a stationary medium. Conduction of heat through a medium involves collision and diffusion of the molecules during their random motion, vibration of molecules, and/or transport of thermal energy through free electrons. Collision and diffusion of molecules predominantly occur in gases and liquid media, whereas vibration of molecules and movements of free electrons are the main heat transfer mechanisms that occur in solids. Heat transfer during heat sealing of thin profile film, coating, and fiber materials is approximately one-dimensional. The rate equation for plane geometry can then be used:

$$q = -K\frac{dT}{dx},$$

where q is the neat flux (W/m2), which is the heat transfer rate in the x-direction per unit area perpendicular to the direction of transfer, and $$\frac{dT}{dx}$$

is the temperature gradient in the x-direction, and K (W/m° K) is the thermal conductivity that characterizes the heat transport property of a given material. As explained, mineralization of the polymeric matrix impacts the layer's K value, and thus when mineral-containing polymer films are clamped together with heated seal jaws, the conduction of heat from the surface into the film medium will result in transient altered heat transfer vs. polyolefins. The temperature of the mineralized film increases with differing time along the temperature gradient. In most transient heat conduction problems, the temperature is dependent on both time and the position along the direction of the medium. The mathematical equations that explain the thermal conditions at the boundaries of a system are called boundary conditions. Mineralized layer boundary conditions result in far superior heat seal attributes. In reality, since the film-film or polymer-fiber interface does not have perfect contact between surfaces due to the presence of micro-gaps, resistance to heat flow will need to be taken into account during heat transfer modeling analysis. When thermal energy is transferred across the interface by conduction through the contact faces, and through the interstitial pockets of air (or liquid contaminant) present in the micro-gap. The heat transfer across an interface can be explained according to Newton's law of cooling, applicability in real experimental conditions. These assumptions involved surface roughness or smoothness, different contact geometry such as small slopes or curved shapes, and so on.

Seal integrity can be defined as a seal that is continuous and consistent without having any discontinuities, such as micro-leaks, or any other defects such as wrinkles, abrasions, dents, blisters, and delamination. Seal integrity is important in food packaging to ensure that the product is protected from unwanted factors from the atmosphere, such water vapor, that are deleterious to sensitive components in food. Seal integrity and seal strength are the main parameters that determine the quality of a heat seal. Seal integrity is defined as a seal continuum in which there is a complete fusion of the polymer with no discontinuities. The maximum seal strength can be defined as the maximum force per unit width of seal required to separate progressively the seal, under some specific test conditions. In many food packaging applications, adequate seal strength is critical during product distribution to ensure that the package can withstand mechanical stresses because of handling. Accordingly, seal strength is often used as one of the process control parameters to ensure that adequate seal integrity is achieved. The dominant process variables that dictate seal strength are jaw temperature, jaw configuration, and dwell time (the time spent in the seal cycle when polymer films are held together by the seal). Higher peel seal strength was reported using linear low density polypropylene (LLDPE) samples of less branched and higher molecular weight. Also, reported seal strength of a semi-crystalline polyolefin was closely related to the melting temperature. Upon polyolefin mineralization, the melt temperature of the polymer content remains the same. However, the mineral content improves the performance of less crystalline structures through more efficient heat conductivity and diffusion characteristics.

Seal strength properties can also be affected by surface treatment and modification of polymer films. In general, homopolymers require less contact time to achieve the maximum seal strength than polymers containing structurally different (heterogeneous) copolymers. Mineralization from about 20% to about 65% altered those dynamics due to the changed thermal properties of the matrix, particularly entanglement at the interface layer. For example, samples sealed at the jaw temperatures (150° C. and 165° C.) at 1.5 seconds dwell time found that mineralization decreased dwell time. Also, slightly increasing jaw temperature further improved dwell times and significantly improved seal peel strength from about 10% to about 30%. Under this high temperature long seal time seal condition, interface temperatures ranged from about 130° C. to about 150° C. These results suggest that long contact time results can be improved when sealing at higher jaw temperatures to prevent excessive squeeze out of polymer melt, and possible material degradation, whereas at lower jaw temperatures, the dwell time is still sufficient to allow for the melting of crystallites and diffusion of polymer chains across the interface to form a strong seal. Example mineral containing layer weights are from about 7.5 lbs/3 msf to about 60 lbs/3 msf, having heat seal strengths from about 1.25 lbs/in and to about 6.45 lbs/in, and terminal hot tack strength from about 2.10 to about 8.55 N/in. Heat seal initiation temperatures from about 59° C. to about 76° C. and hot tack initiation temperatures from about 57° C. to about 99° C. Pressure during dwell from about 10 psi to about 80 psi and dwell times from about 0.30 seconds to about 1.75 seconds.

Further, low temperature seals from about 340° C. to about 425° C. at dwell time intervals of about 0.50 to about 6.25 seconds with seal pressures from about 20 psi to about 85 psi have average peel force from about 0.50 to about 4.0 lbs lbs/inch. Heat seal process methods that can used also include tray sealers, transverse form-fill-seal, platen die, and rotary 4-side machines.

Within the cube and block particle class, above, particle surface area is an important filler property. For example, many effects are surface-to-area dependent and can impact polar polymers. Polar characteristics can have an impact on surface tension and surface energy levels. The preferred, but not limited to, average particle surface area within the composite is from about 1-1.3 $m^2/g$ to about 1.8-2.3 $m^2/g$. Further, preferred particle types having the average surface particle surface area include the calcites group, of which aragonite, calcium carbonate, dolomite, anhydrite, and barite are included. Mineral fillers used have a very positive effect on pre- and post-extrusion conditioning methods used to improve adhesion and the surface performance of a polymer layer. Calcium carbonate particles have been found to be particularly useful, including particles having about 18-80% particle diameters finer than 6 μm and about 33-96% particle diameters less than 10 μm. Other preferred, but not limited to, particle characteristics of $CaCO_3$ are shown in Table 9, below.

Table 9

TABLE 9

| Particle characteristics of $CaCO_3$ | |
| --- | --- |
| Particle Coating | Fatty Acids Including Stearates |
| Hunter Reflectance (Green) | 91-97% |
| Hunter Reflectance (Blue) | 89-96% |
| Mohs Hardness | 2.75-4.0 |
| pH in Water, 5% Slurry, 23° C. | 8.5-10.5 |
| Resistance in Water, ohms, 23° C. | 5,000-25,000 |
| ASTM Dl 199 Max % on 325 Mesh | 0.05-0.5 |
| Volume Resistivity @ 20° C. | $10^9$-$10^{11}$ ohms |
| pH | 8.5-10.5 |
| Standard Heat of Formation, $CaCO_3$ from its Elements @ 25° C. | 288.45-288.49 Kg-cal/mole |
| Standard Free Energy of Formation, CaCO3 from its Elements | 269.53-269.78 Kg-cal/mole |
| Specific Heat (between O to 100° C.) | 0.200-0.214 |
| Heat Conductivity | 0.0071 g · ca;/sec · $cm^2$ · 1 cm thick 20° C. |
| Coefficient of Linear Expansion | C = 9 × $10^{-6}$ @ 25 to 100° C. C = 11.7 × 10 (m 25 to 100° C. |

Also, nano-cellulose can be used in the mineral containing composite layer having a crystalline content from about 40%-70%, including nano-fibrils, micro-fibrils, and nanofibril bundles, having lateral dimensions from about 0.4-30 nanometers (nm) to several microns, and highly crystalline nano-whiskers from about 100 to 1000 nanometers. Nano-cellulose fiber widths are from about 3-5 nm and from about 5-15 nm, having charge densities from about 0.5 meq/g to about 1.5 meq/g, with the nano-cellulose having a stiffness from about an order of 140-220 GPa and tensile strength from about 400-600 MPa.

Most pure inorganic matter, including salts, has very high surface energy as measured by surface tension, e.g. up to and over 200 dynes/cm, due to the imbalance of bonding forces at the surface. High surface-free-energy materials are generally hydrophilic and absorb water from hydrogas of the atmosphere, corresponding reducing the energy level based on the rule that all matter tends to assume its lowest energy, most stable state. Observed surface tensions on all high surface energy mineralized layers between 95% and 0.6% relative humidity are found to be pre-treatment levels from about 34 dyne/cm to about 45 dyne/cm, respectively. In comparison, unfilled (neat) LDPE has an approximate 32 dynes/cm. As particle size decreases, surface activity increases. Small to very small particles have little mass, low bulk densities, and are affected by forces of agglomeration. The forces may be mechanically effective over great distances relative to molecular dimensions. These forces greatly improve adhesion to fibers of the composite during extrusion coating production. Also, the enhanced surface energy levels (dyne) greatly improve surface performance for ink and mineral containing layer composite surface adhesive applications.

Further, this composite surface performance is magnified when exposed to treatments found on extrusion coating lines to enhance neat polyolefin (unfilled) layers. The type of treatment largely depends upon the type of substrate to be extrusion coated. In flame treatment, which is primarily used for heavy paper and paperboard, the fiber substrate is lightly oxidized to enhance its adhesion to the polyolefin. The flame temperature is in the range of about 1500-2100° C. The term polyolefin encompasses all those polymers produced by an olefin as a starting monomer, whose general formula is $C_nH_{2n}$. Most common polyolefins in the packaging field are polyethylene (PE) and polypropylene (PP). Although they have different specific properties, both polymers are inherently hydrophobic, which is in turn responsible for their typically poor wet-ability, especially to waterborne adhesive and printing systems. For this reason, polyolefins generally need to be surface-activated before the deposition of inks, paints, adhesives, metals, and coatings. Flame treatment is a valuable technique to improve the surface energy of neat polyolefins. However, because calcite fillers are generally very hydrophilic and the filler provides advanced surface energy, the net result of flame treating is enhanced, resulting in superior performance. Further, flame pre-heating paper during the extrusion coating process generates oxidation prior to fiber extrudate contact, improving adhesion. It also heats the paper, removing moisture. The polyolefin extrudate mineral-containing process temperature at fiber contact is elevated, normally between 530° F. and 630° F. Therefore, very little moisture or water is present. Under low moisture and water conditions, 20% to 60% mineral-containing polyolefin has very high resident surface energy levels. These elevated levels (about 45-100 dynes/cm) provide for good fiber polyolefin adhesion and fiber tear during heat sealing, water based, and hot melt glue processes when the mineral-containing layer makes contact with opposing polymer or fiber-containing layers. Flame treatment is simple in design, easy to operate and relatively inexpensive. Plasma treatment to the surface of polypropylene (PP), polyethylene (PE), high-density polyethylene (HDPE), EPDM, and other polyolefin-coated surfaces, is frequently used because of the low resident surface energy found on polyolefin coatings, often between 28-36 dynes/cm² (mJ/m²). For example, expressed in mN/m, the approximate surface energy levels of various materials are: PTFE-20, silicone-20, PP-30, PE-32, PS-34, PC-34, ABS-34, XLPE-32, PUR-34, UV ink-up to 56, water-based coating up to 56, UV-glue up to 50, water-based glue. However, 40% to 60% mineralized layers before demonstrate up to 40% improved dyne levels. Generally, polyolefins with "low surface energy" or "non-polar surfaces" provide poor conditions for adhesives, gluing, or adhesion, thus resulting in poor quality ink wet-ability and graphics and very poor bond strength between the adhesive and its opposing surfaces. Ink wet-ability being defined as the surface tension or surface energy of the solid substrate in relation to the surface tension of the liquid, the better the wet-ability, the smaller the contact angle. The problem is aggravated when using UV curing or water based adhesives, inks, and coatings. The strength of attraction between a material and a coating is determined by the relative surface energy and surface tension of the materials. The higher the solid's surface energy relative to the liquid's surface tension, the greater the molecular attraction. This draws the ink or adhesive closer for high bond strength. The lower the solid's surface energy relative to the liquid's surface tension, the weaker the attractive forces and the coating will be repelled. Plasma- and corona-treated on nontreated polymer-containing layers having mineral content from about 20% to about 70% can exceed the contacting liquid's surface energy from about 1-15 mN/m. The challenge faced when extrusion coating polyolefins and like polymers is to increase the surface energy (polarity) of the material to a level significantly higher than that of the opposing surface tension of the ink, coating, or adhesive, such that the surface provides favorable wetting and adhesion. Typically, the surface energy of the substrate needs to exceed the surface tension of the ink, paint, coating, or adhesive from about $10^{-15}$ dynes/cm² (mJ/m²).

There are several methods of increasing the surface energy and polarity of plastics. These include harsh, potentially environmentally harmful wet chemical treatments, high temperature flame torch treatments, high voltage corona treatment, and plasma surface activation. Plasma surface activation, which exposes low-surface-energy extrusion-coated polyolefins to the highly active environment of either vacuum or atmospheric plasma, is a very effective and long lasting method of increasing their surface energy and polarity.

Corona treatment of plastic substrates involves high voltage and frequency electricity discharged from an electrode into an ionizing air gap (generally about 0.060"), where it passes through the substrate to an electrically grounded metal roll. This treatment increases the surface tension (measured in dynes/cm) of the substrate to at least 10 dynes/cm higher than the tension of the extrusion coating.

However, in higher mineral loadings from about 20%-70% mineral content by weight, because of significant particle exposure, the post-extrusion surface of the mineral polymer composite generally has significantly improved onset energy levels across the surface of the composite. Upon post-corona or plasma treatment commonly used during extrusion coating processes, the mineral reacts more favorably and obtains significantly better post-treat energy levels than solely polymeric surfaces. Table 10, below, illustrates comparative estimated values of dyne levels before and after corona and plasma treatment of the polymer composite by weight of filler added. Results can vary up to ±25% depending upon mineral selected and process variables. Without posttreatment, the organic dyne level of a mineral-filled polymer (from about 20% filled up to about 70% filled) can be improved from about 10% to about 30%.

TABLE 10

Surface Energy Mineral-Containing Layer Values

| Polymer | No Post-Treatment | Post-Treated | 10-20% | 30-40% | 40-70% |
| --- | --- | --- | --- | --- | --- |
| Polypropylene | 20 Dyne | 29-36 | +5% | +30% | +50% |
| Polyethylene | 32 Dyne | 39-42 | +2% | +45% | +50% |
| Polystyrene | 34 Dyne | 39-44 | +2% | +30% | — |

The mineral-containing interspersed or non-interspersed polymer composite layer can be substantially and continuously bonded directly to a fiber surface or to the fiber surface interface adhesive layer using extrusion coating or extrusion lamination. Further, the fiber-containing layer can contain inorganic mineral coatings and fillers, e.g. clay, kaolin, $CaCO_3$, mica, silica, $TiO_2$ and other pigments, etc. Other materials found in the fiber-containing layer include vinyl and polymeric fillers and surface treatments such as starch and latex. Preferred characteristics of the fiber-containing layer bound to the mineral-containing layer include, but are not limited to, a smoothness range of about 150 to about 200 Bekk seconds, and an ash content from about 1% to about 40% by weight. Also, in this example, the fiber-containing layer coefficient of static friction, $\mu$, is from about 0.02 to about 0.50. Identified cellulose within the fiber-containing layer preferably has a thermal conductivity from about 0.034 to about 0.05 W/m·K. If using air-laid paper or non-woven fibers, the fiber content is preferably from about 40% to about 65% of the layer by weight. Other preferred, but not limiting, characteristics of the fiber-containing layer are shown in Table 11, below.

TABLE 11

Fiber Layer Characteristics

| | |
|---|---|
| Fiber Aspect Ratio (Average) | 5-100 |
| Fiber Thickness (Softwood) | 1.5-30 mm |
| Fiber Thickness (Hardwood) | 0.5-30 mm |
| Filled Fiber Content | 1% to 30% |
| Fiber Density | 0.3-0.7 g/cm$^2$ |
| Fiber Diameter | 16-42 microns |
| Fiber Coarseness | 16-42 mg/100 m |
| Fiber Pulp Types (Single- to Triple-Layered) | Mechanical, Thermo-Mechanical, Chemi-Thermo-Mechanical, and Chemical |
| Permeability | 0.1-110 m$^2$ × 10$^{15}$ |
| Hydrogen Ion Concentration | 4.5-10 |
| Tear Strength (Tappi 496, 402) | 56-250 |
| Tear Resistance (Tappi 414) | m49-250 |
| Moisture Content | 2%-18% by Weight |

Coextrusion methods provide the possibility for non-interspersed contact layers within the mineral-containing layer. Based on performance and structural requirements, the finished composite structures can contain separate layers in the composite that can vary based on types of mineral and amount of mineral content per layer, degrees of amorphous and crystalline content per layer, and type of polymer resin and resin mixes per layer. The more extruders feeding a common die assembly, the more layered options become available to the non-interspersed mineral-containing layer. The number of extruders depends on the number of different materials comprising the coextruded film. For example, a non-interspersed mineral-containing composite may comprise a three-layer to six-layer coextrusion including a barrier material core that could be, for example, a high density polyethylene and low density polyethylene mix having a 25% to 65% mineral content by weight in the first base layer, this layer making contact with the fiber surface. Subsequent layers may contain differing mineral contents, neat LDPE, or polypropylene. Another example is a six-layer coextrusion including a bottom layer of LDPE, a tie-layer resin, a 20% to 65% mineral-containing polypropylene barrier resin, a tielayer, and an EVA copolymer layer, and a final layer of polyester. Tie-layers often are used in the coextrusion coating of multiple layer constructions where mineral-containing polymers or other resins would not bond otherwise, and tie-layers are applied between layers of these materials to enable desired adhesion. Another example multilayer film construction is 25%-65% mineral content LLDPE/tie-layer/EVOH barrier/tie-layer/EVA. Interspersed, e.g. monolayer, and noninterspersed, e.g. multilayer, coextrusions can comprise from one to six layers of the mineral-containing layer substantially and continuously bonded across the surface of a fiber containing layer. Layers can be designed to improve hot tack, heat-sealability, seal activation temperature, and extrudate adhesion to fiber, mineral enhancement of barrier performance, surface energy, hot and cold glue adhesion improvements, etc.

Table 12, below, shows example layer constructions (not limited to) found in the mineral-containing resin and extrusion coated or laminate composite structure. The preferred single layer ranges contain from about 0% to about 65% by weight mineral content, from 25%-80% amorphous to 25%-80% crystalline structure by weight, and 25%-65% cellulose, nano-cellulose, or nano-minerals by weight. Also, the mineral content of the mineral-containing layer(s) may comprise different fillers with different densities, size, and shape depending upon the desired outcome of the final composite structure.

TABLE 12

Examples of Non-Interspersed (Multilayered) Mineral Composite Layers

| Layer Structure | Example 1 | Example 2 | Example 3 | Example 4 | Example 5 | Example 6 |
|---|---|---|---|---|---|---|
| Monolayer (1) | LDPE | HDPE | LDPE-HDPE resin blend | LDPE-MMW HDPE resin blend | LLDPE-LDPE resin blend | PLA-bio derived starch based resin blend |
| Monolayer (2) | Bio-derived, starch polymer blend | LDPE-bio derived starch polymer blend | LDPE-LLDPE-bio derived starch blend | LDPE-HDPE-LLDPE-blend | PP-bio derived starch based polymer blend | ULDPE-HDPE-bio derived starch polymer blend |

TABLE 12-continued

Examples of Non-Interspersed (Multilayered) Mineral Composite Layers

| Layer Structure | Example 1 | Example 2 | Example 3 | Example 4 | Example 5 | Example 6 |
|---|---|---|---|---|---|---|
| 3-Layer | HDPE-LDPE | HDPE-PP | HDPE-PET | LDPE-PP | LLDPE-PET | EVA-LDPE |
| 4-Layer | EVA-ethylene vinyl acetate EEA-ethylene acrylic acid HDPE-EAA ethylene acrylic acid | HDPE-EVA Ionomer resin-Polyamides | Biaxially oriented homo-poly-propylene-polyester-poly-propylene-PE | Oriented poly-propylene HDPE-PE metalized PET | EVA-PE-MMWHDPE-oriented poly-propylene | PVC-ABS-PC Nylon |

Additional downstream product applications for monolayer and multilayer mineral-containing layers bonded to fiber-containing layers include, but are not limited to, coated Tyvek® and Tyvek® trays, coated paper for form-fillseal, peelable films, and direct seal labels.

In some cases, the mineral-containing layer can be designed as a wave blocker, including UV. Using mineral content from about 15% to about 65% can block various waves within the wave spectrum from about 10% to about 100% if the layer is from about 2.5 lbs/3 msf to about 150 lbs/3 msf total layer weight. The sum of all the layers in the mineral-containing composite can obstruct some waves as shown below in Table 13, below.

TABLE 13

Wavelength Classes

| CLASS | FREQUENCY | WAVELENGTH | EI |
|---|---|---|---|
| Y | 300 EHz | 1 pm | 1 |
| HX | 30 EHz | 10 pm | 1 |
| SX | 3 EHz | 100 pm | 1 |
| EUV | 300 PHz | 1 nm | 1 |
| NIR | 30 PHz | 10 nm | 1 |
| MIR | 3 PHz | 100 nm | 1 |
| FIR | 300 THz | 1 μm | 1 |
| EHF | 30 THz | 10 μm | 1 |
| SHF | 3 THz | 100 μm | 1 |
| UHF | 300 GHz | 1 mm | 1 |
| VHF | 30 GHz | 1 cm | 1 |
| HF | 3 GHz | 1 dm | 1 |
| MF | 300 MHz | 1 m | 1 |
| LF | 30 MHz | 10 m | 1 |
|  | 3 MHz | 100 m | 1 |
|  | 300 kHz | 1 km | 1 |
|  | 30 kHz | 10 km | 1 |

Additionally, if relative clarity is desired in the mineral-containing composite layer the following resins are possible, but not limiting, bonding agents for these materials: carboxy-polymethylene, polyacrylic acid polymers and copolymers, hydroxypropylcellulose, cellulose ethers, salts for poly(methyl vinyl ether-co-maleic anhydride), amorphous nylon, polyvinylchloride, polymethylpentene, methyl methacrylate-acrylonitrile-butadiene-styrene, acrylonitrilestyrene, polycarbonate, polystyrene, polymethylacrylate, polyvinyl pyrrolidone, poly (vinylpyrrolidone-co-vinyl acetate), polyesters, parylene, polyethylene napphatalate, ethylene vinyl alcohol, and polylactic acids containing from about 10% to 65% mineral content. Various mineral-containing layer polymer and mineral content can be determined based upon performance and content requirements considering the parameters shown in Tables 1-21, above. Branched, highly branched and linear polymer combinations are possible in all composite layer constructions. Examples are shown in Table 20 (not limited to combinations within the table) of the interspersed and non-interspersed mineral-containing layer constructions, not including tie layers. Layer combinations depending on coextrusion die design, flow properties, and processing temperature allowing for coextrusion fusion layers and/or subsequently extrusion laminating or laminating the layers into the final mineral-containing composition of which individual (non-interspersed) or total combination of layers having by weight mineral content of about 20-65%. Layers can be uniaxially or biaxially oriented (including stretching) from about 1.2 to about 7 times in the machine direction (MD) and from about 5 to about 10 times in the transverse direction, and stretched from about 10% to about 75% in both the (MD) and (CD) directions. Generally, although not limited to, polyolefin mineral content bonding agents have number average molecular weight distributions (Mn) of from about 5,500 to about 13,000, weight average molecular weight (Mw) of from about 170,000 to about 490,000, and Z average molecular (Mz) of from about 170,000 to about 450,000. Contained within the mineral-containing composite monolayer or multilayer (dispersed or non-interspersed) structure may differ in molecular weight, density, melt index, and or polydispersity index. The polydispersity index being the weight average molecular weight (Mw) divided by the number average molecular weight (Mn). For example only, and without limitation, the mineral-containing layer may have a Mw/Mn ratio of from about 6.50 to about 9.50. Using wet or dry ground $CaCO_3$ as an example, it can be surface treated at levels from about 1.6 to about 3.5 mg surface agent/$m^2$ of $CaCO_3$. The surface treatment can be applied before, during, or after grinding. Mean particle sizes range from about, but not limited to, 0.7 to about 2.5 microns, having a top cut from about d98 of 4-15 microns, and a surface area of from about 3.3 to about 10.0 $m^2/g$. For improved dispersion into the polyolefin bonding agent, the $CaCO_3$ mineral content can be coated with fatty acids from between, but not limited to, about 8 to about 24 carbon atoms.

The preferred surface treatment range is about 0.6 to about 1.5% by weight of treatment agent or about 90-99% by weight of $CaCO_3$. Polyolefin bonding agents having lower molecular weights and high melt index provide improved downstream moisture barrier characteristics.

Brightness is the reflectivity of naturally colored pulps, and of paper and board made from such pulp, to light in the blue portion of the spectrum. As such, brightness is defined as the reflectivity of naturally colored pulp, paper, boards woven, synthetic, and non-woven fiber-containing layers, at an effective wavelength of 457 nm. Light of this wavelength appears blue to the human eye. Brightness is an important appearance property of paper not only because of its aesthetic value, but also because of its effect on legibility and contrast between print and paper. Brightness should not be confused with "whiteness." The degree of whiteness of a paper conveys information on its color neutrality. Two widely accepted methods of brightness measurement are GE brightness, chiefly employed in the United States, and ISO brightness, widely used in other countries, especially in Europe. The TAPPI standards describing these methods are T 452 for GE brightness and T 525 for ISO brightness.

When applied to a fiber-containing layer, the present mineral-containing layer(s) can substantially improve the brightness of the fiber-containing layer when the fiber layer has from about 40 to about 90 GE brightness. Depending upon desired results, the mineral-containing layer can employ a variety of mineral selections and be both dispersed and non-dispersed. Particles can vary in size, shape, and type. The mineral composite mineral-containing layer can vary in weights from about 8 lbs/3 msf to about 50 lbs/3 msf with thicknesses from about 0.5 mil to about 5 mil, and individual layer or combined layer weighted average densities from about 0.91 $g/cm^3$ to about 1.55 $g/cm^3$. Depending upon the nature and existing brightness of the fiber-containing layer, the fiber-containing layer can have improved brightness from about 10% to about 250%. For example, the fiber-containing layer with a brightness of 40 could be improved to a brightness level of about 100.

Opacity is related to the ability of light to pass through paper. The TAPPI test (Method T245) for opacity compares the diffuse reflectance from a paper surface that is backed alternately by (a) a black cavity, from which essentially no light returns to the paper, and (b) a standard white tile surface having a reflectance of 89%. By contrast, the printing opacity (TAPPI Method T519) can be defined as the ratio of reflectance from a paper sheet backed by a perfect black (either a black cavity or a black tile), and from a sufficiently thick stack of identical sheets of paper.

Many problems related to opacity can be anticipated from an understanding of how light interacts with the structure of paper. Opacity usually is highly correlated to the efficiency of light scattering by the paper material (except if there are large variations in the color or in the amount of light-absorbing material). High light-scattering efficiency will be achieved if there is a high incidence of spaces within the paper that have dimensions greater than at least a quarter of a wavelength of light. In rough terms, for the highest light scattering, one wants the greatest number of interfaces between solid and air.

When applied to a fiber-containing layer, the present mineral-containing layer(s) can substantially improve the opacity of the fiber-containing layer when the fiber layer has an opacity as low as about 78 and up. Depending upon desired results, the mineral-containing layer can employ a variety of mineral selections and can be both dispersed and non-dispersed. Depending upon the nature and existing opacity of the fiber-containing layer, the fiber-containing layer can have improved brightness from about 5% to about 30%. For example, the fiber-containing layer with an opacity of 79 could be improved to a brightness level of about 94 opaque.

Whiteness is an important cosmetic characteristic of a finished package. The CIE (Commission Internationale de l'Eclairage—International Commission on Illumination) whiteness is a measure of whiteness is a measurement of the light reflected by paper across the visible (daylight) spectrum. The CIE have set a standard of D65 illumination, which is a standard representation of outdoor daylight under which the amount of light reflected is measured. For a perfect reflecting non-fluorescent white material, the CIE whiteness would be 100. However most 'white' paper will have CIE whiteness measures of between 130 and 170 due to the addition of Optical Brightening Agents (OBAs), which are designed to reflect light from the non-visible range (mainly ultraviolet) back in the visible spectrum.

Depending upon desired CIE whiteness requirements for the finished composite surface, the mineral-containing layer in the present composite structures can employ a variety of mineral selections and be both dispersed and non-dispersed within the overall mineral composite layer. Particles can vary in size, shape, and type. Depending upon the nature and existing CIE whiteness of the fiber-containing layer, the fiber-containing layer can have improved whiteness from about 5% to about 80%. For example, the fiber-containing layer with a whiteness of 79 could be improved to a brightness level of about 141 white.

Barrier performance in the area of moisture, oils, fatty acids, and water are critical aspects of food, detergent, and other packaging applications within the consumer packaging space. Because paper is a randomly felted layer of fiber, its structure has a varying degree of porosity. Thus, the ability of fluids, both liquid and gaseous, to penetrate the structure of paper becomes highly significant to the use of paper.

Methods currently used in consumer packaging structures relating to barrier performance include neat thermoplastic coatings applied in single and multiple layers contacting the fiber surface. Also, a variety of emulsion and waterborne polymer- and mineral-containing coatings can be applied with or without using thermoplastics and at room temperatures. However, these methods are either costly or do not provide desired levels of barrier performance, most particularly at the point of fracture or bending when cutting, shaping, and forming a packaging structure. Further, heat scalability and fiber adhesion are other critical aspects during the packaging manufacture and forming process. Finally, high quality printing surfaces are desirable, and existing methods do not provide sufficient cosmetics at desired cost levels.

Extruded mineral-containing interspersed and noninterspersed composite layers of the present embodiments demonstrate high barrier performance characteristics when substantially and continuously bonded to fiber-containing layers. The fiber-containing layers may include in their composition or surface, but are not limited to, mineral and polymeric sizings, surface treatments, coatings, and mineral fillers. Some advantages of the non-fiber content of the fiber containing layer include improved fiber layer printability, ink hold out, dynamic water absorption, water resistance, sheet gloss, whiteness, delta gloss, pick strength, and surface smoothness. Often, mineral content contained within or upon one or more opposing surfaces of the fiber-containing layer can include, but is not limited to, clay, calcined clay, or combinations thereof. The minerals are frequently applied to the surface of the fiber-containing layer through a blade or air coating process. Common mineral binding methods include the use of protein systems such as a mixture of vinyl acrylic/protein co-binders. Another non-limiting example is tribinder systems, e.g. SB/Pvac/Protein. Further, pigments such as $TiO_2$ can be included to improve whiteness characteristics. The nature of the fiber layer's mineral and binder content can impact the selection of the non-interspersed and interspersed mineral-containing layer characteristics when bonded substantially and continuously to one or more sides of the fiber containing layer(s), which comprise part of the composite structure. Examples of non-fiber content in the fiber-containing layer include, but are not limited to, 50-95% of #1 clay or #1 fine clay, 3-20% by part calcined clay, 3-40% by part $TiO_2$, 2-45% vinyl acrylic, and from about 1% to about 35% protein binders, co-binders, or tri-binders.

Also, the fiber-containing layer surfaces can have from about 55% to about 88% TAPPI452 surface brightness. The examples shown in Table 14, below, illustrate acceptable, but not limiting, fiber-containing layer characteristics for substantially and continuously bonding to the mineral-containing layer. Surface roughness values are based upon Parker Print Surf (μm) and Bendtsen (mls/min) per TAPPI T-479 (moderate pressure), TAPPIT-538, and TAPPI 555 (print-surf method). Tear resistance per TAPPI T-414 standards are expressed in millinewtons (mN). Surface brightness is expressed per TAPPI 452. Burst strength is expressed per TAPPI 403 standards. Bursting strength is reported as burst ratio=bursting strength (lbs/in2)/basis weight (lbs/ream). Internal bond strength or interlayer strength of the fiber containing layer is an important characteristic as represented by TAPPI T-403 and T-569. Preferred fiber-containing layer internal strengths are, but are not limited to, from about 125 $J/m^2$ to about 1150 $J/m^2$. Further, fiber-containing layer Z-direction tensile strength per TAPPI T-541 testing standard is from about 45-50 Nm/g to about 950 Nm/g. Finally, preferred, but non-limiting, fiber-containing layer air resistance per TAPPI 547 is from about 0 to about 1500 mls/min, as represented by the Bendsten method.

TABLE 14

Fiber-Containing Layer Characteristics

| Fiber Weight (lbs/3 msf) | $g/m^2$ | Tear Resistance (Mn) | Surface Roughness | Burst Strength (kPa) |
| --- | --- | --- | --- | --- |
| 40-75 | 60-110 | 400-700 | 2.0-5.5 μm | 140-300 |
| >75 | 110-130 | 650-750 | 2.0-3.5 μm | 175-400 |
| >115 | 180-190 | 1400-1900 | 100-2500 mls/min | 175-475 |
| >130 | 205-215 | 1600-2200 | 100-2500 mls/min | 250-675 |
| >200 | 315-330 | 1900-3200 | 100-2500 mls/min | 500-950 |
| >300 | 460-195 | 500-4000 | 100-2500 mls/min | 700-1850 |

Table 15, below, displays finished composite board barrier performance ranges, but is not limited to, that of a composite structure having from about 20% to about 70% mineral-containing layer bonded to at least one side of a fiber-containing layer. The mineral-containing layer can be either a dispersed monolayer or non-interspersed coextrusion, for example.

TABLE 15

Barrier Values of Formed Composite Structure

| Sample # | Test Method Test Name Units Fiber Layer | | TAPPI T441 Cobb Water Absorption $g/m^2$ | | TAPPI T404 WVTR in Tropical Conditions | | TAPPI T410 Mineral layer Wgt | | Tappi T559 Grease Resisitance 3M Kit Test# | |
| --- | --- | --- | --- | --- | --- | --- | --- | --- | --- | --- |
| | | | 2 minute Cobb | 30 minute Cobb | $g/m^2$ | g/100 $in^2$ | $g/m^2$ | lb/1000 $ft^2$ | Coated Side | Uncoated Side |
| 1 | Recycled Fiber | .28 mil caliper | 0.22 | — | 23.4 | 1.51 | | | *12 | **1– |
| 2 | Virgin Fiber | .20 mil caliper | 0.40 | 0.00 | 15.2 | 0.98 | 32.3 | 4.12 | 12 | 1– |
| 3 | Recycled Fiber | .20 mil caliper | 0.00 | — | 18.6 | 1.20 | | 3.45 | 12 | 1– |
| 4 | 85-100% Recycled Fiber | .20 mil caliper | 0.10 | 0.05 | 13.9 | 0.89 | 18.25 | 3.55 | 12 | 1– |
| 5 | Virgin-TMP content | .36 mil caliper | — | — | 7.58 | 0.49 | | | 12 | 1– |
| 6 | Clay coated 1 side-bleached | .18 mil caliper | — | 0.45 | 7.13 | 0.46 | | 7.5 | 12 | 1– |
| 7 | Fiber 2-side bleached | .18 mil caliper | 0.00 | — | 9.31 | 0.60 | | 0.44 | 12 | 1– |
| 8 | Fiber 1-side, bleached | .18 mil caliper | 0.50 | 0.11 | 37.7 | 2.43 | | 11.33 | 12 | 1– |
| 9 | Virgon Kraft-clay coated | .16 mil caliper | 0.05 | 0.11 | 15.0 | 0.97 | | 3.94 | 12 | 1– |
| 10 | Virgon Kraft-clay coated | .14 mil thick | 0.00 | 0.10 | 14.1 | 0.91 | 28.1 | 3.89 | 12 | 1– |
| 11 | Clay coated unbleached kraft-100% virging | .18 mil caliper | 0.00 | 0.05 | 13.9 | 0.84 | | 6.2 | 12 | 1– |
| 12 | Solid Unbleached Sulfate | .18 mil caliper | 0.00 | 0.00 | 9.49 | 0.61 | 52.2 | 5.5 | 12 | 1– |

Table 16, below, shows the barrier performance of a formed composite having a monolayer HDPE-PE mix with a density from about 0.925 gm/cm3 to about 0.960 g/cm3 containing from about 36% to about 45% mineral content by weight.

TABLE 16

Barrier Values of a Formed Composite Structure, Interspersed (Mono), Mineral-Containing Layer Monolayer 40%-60% Mineral Content (HDPE-PE-MIX)

| Fiber type Unit | Cobb Water Absorption g/m² | | WVTR in Tropical Conditions 100° F./ 90% R.H. | | Mineral layer weight | |
|---|---|---|---|---|---|---|
| Sample | 2-min | 30-min | g/m² | g/100 in² | g/m² | lb/1000 ft² |
| Recycled | 0.2 | 0.1 | 16.7 | 1.08 | 24.9 | 5.09 |
| Recycled | 0.0 | 0.0 | 9.7 | 0.63 | 49.6 | 7.4 |
| Virgin Kraft | 0.0 | 0.1 | 11.1 | 0.72 | 32.8 | 6.73 |
| Virgin Kraft | 0.1 | 0.1 | 9.9 | 0.64 | 36.9 | 7.57 | down to about 12 g/m² layer weight. The data illustrates two different MVTR values. The first value is coextrusion. Coextrusion can provide superior results because of the flexibility to alter the type of polymers used per layer, density, branched or linear molecular nature, as well as crystallinity, among others. Also, because of stress fracturing found in more monolayer constructions as a result of bending, scoring, and processing, performance improvements using coextrusion are possible. The base layer in the coextrusion can be more dense and crystalline, for example, than the outer layer, which is more amorphous and light density and more linear, thus not as vulnerable to stress fracture within the matrix, preventing percolation through the layer. Other options for improving processing include additives to the mineral-containing blend, which include, but are not limited to, elastomers.

TABLE 17

Barrier Attributes of Mineral-Containing Layer Bonded to Fiber-Containg Layer Based for Interspersed (Monolayer) and Non-Interspersed (Coextended)

| Project Barrier Performance Table Ethylene Co-Polymer Mineral Layer Density . . . % Amorphons Range | Compote Fiber Layer- Outer Uncoated Box board | | Flat Samples Pre Score + Bed RAnges WVTR- Tropical gm/ m2 day | Variation | Full Case Post Score WVTR gm/ m2 day | WVTR Variation | Mineral Layer Weight Ranges | |
|---|---|---|---|---|---|---|---|---|
| | | Mineral 38-65% | | | | | | |
| 1.22-1.41 g/cm3  25%-65% | 20 pt. Kiabin | 2 + layer coex | 5 to 13 | 0.20 | 11 to 17 | 0.2 | 15 gsm | 50 gsm |
| 1.22-1.36 g/cm3  25-70% | 20 pt. Kiabin | Mono- layer | 8 to 22 | 0.2 | 14 to 25 | 0.2 | 15 gsm | 50 gsm |

TABLE 16-continued

Barrier Values of a Formed Composite Structure, Interspersed (Mono), Mineral-Containing Layer Monolayer 40%-60% Mineral Content (HDPE-PE-MIX)

| Fiber type Unit | Cobb Water Absorption g/m² | | WVTR in Tropical Conditions 100° F./ 90% R.H. | | Mineral layer weight | |
|---|---|---|---|---|---|---|
| Sample | 2-min | 30-min | g/m² | g/100 in² | g/m² | lb/1000 ft² |
| Virgin Kraft | 0.0 | 0.1 | 8.7 | 0.56 | 36.2 | 7.42 |
| Virgin Kraft | 0.0 | 0.2 | 7.8 | 0.50 | 41.0 | 6.46 |
| Virgin Kraft | — | — | — | — | 26.1 | 5.35 |

Table 17, below, shows projected moisture barrier performance (MVTR, WVTR) for the present embodiments, comparing a coextruded mineral-containing layer bonded to a surface of a fiber-containing layer, the mineral-containing layer having both a monolayer and a multilayer (coextrusion) construction. The fiber-containing layer in Table 17 lists Klabin virgin kraft fiber. However, the data is applicable to a range of both virgin and recycled fiber surfaces to include similar various weights and densities known in the art. Maximum MVTR via coextrusion is projected to be about the values in Table 25 in mineral-containing layers In the present embodiments, label composites containing a mineral content layer within the structure can be used for forming labels for use in graphics, printing, engraving, marking, lasering, cosmetic, wave block, environmental the present embodiments can be bonded into the label structure and/or applied to the label destination surface using both extrusion and hot and cold application techniques. Embodiments of the present mineral-containing layer also provide hot tack and adhesive properties. Further advantages include blocking and surface friction performance having impact on label immersion, stability, and removal performance in exposure temperature conditions from about 70° F. to about 130° F. And yet additional mineral-containing layer advantages include die cutting and stripping performance related in part to coefficients of friction provided by mineral particles making contact with opposing surfaces having densities from about 5%-120% variable from that of existing label layers or adhesive surfaces.

Pressure sensitive labels having one or more mineral-containing layers according to the present embodiments can be permanently or temporarily adhered or bonded during pre- or post-application (to the label destination surface), with the mineral-containing layer making contact directly to the chosen destination surface. Adhesive layers can make contact with one or more opposing surfaces of the mineral-containing layer. Further, one or more adhesives could make contact with the mineral-containing layer and the outer surface of the structure on which the label is applied, or the mineral-containing layer could comprise the outer surface of the label, with an adhesive backing on the opposing outer mineral containing layer surface that is either permanently or temporarily directly bonded to the product or packaging surface in which the product is enclosed.

From to about 20% to about 40% mineral-containing layers in the present embodiments can make contact with thermoplastic or non-thermoplastic waterborne or emulsion carried polymer or starch-containing adhesives and glues currently used in the art. Adhesives can permanently or temporarily bond the present mineral-containing layer(s) to any of the outer or inner surfaces of the label structure itself, forming the label structure that may be applied with our without heat or pressure, but not limited to, label destination surfaces having metal, polymer, glass, woven, wood, cellulose, lignin, nano-treated surfaces, paper coatings, woven, or non-woven content. Further, the label itself may contain all or in part the same materials as the destination surface. Label structures might also include, for example, mineral-containing layers used as preprinted or non-preprinted layers that are subsequently adhered to corrugated liners and shaped to form corrugated structures.

The present mineral-containing layer or layers make functional contact with adhesives found in outer or inner label surfaces. The surfaces include label liners used for cold, wet, or dry strength label applications in calipers from about 0.75 mil to about 10 mil. The finished labels can be used in both roll-to-roll or singly applied applications with basis weights from about 10 lbs/3 msf to about 400 lbs/3 msf. The mineral containing layer can be used as a layer or part of a pressure sensitive label having an MD-CD strength from about 4 to 9 lbs per inch to about 1 to 15 lbs per inch, MD-CD tear strengths from about 60 grams to about 64 grams, and with MD-CD tear strengths from about 2 lbs to about 15 lbs per sheet.

One example of label adhesive is emulsion acrylics contacting the mineral-containing layer with metals, polyesters, polymers, and glass-containing surfaces. The adhesive has loop tack from about 1.5 lbs to about 3.5 lbs and corresponding peel adhesion from about 0.5 to about 4.0 lbs. Surface application temperatures are from a minimum of about −22° F. with service temperatures from about −70° F. to about 220° F.

The present mineral-containing layer(s) can functionally contact one or more polymer or polyester containing label liner layers within the label structures, often but not limited to label roll stock across a web, with the liner layer having calipers from about 0.50 mil to about 2.5 mil and MD-CD tensile strengths from about 15,000 psi to about 60,000 psi and from about 16,000 to about 55,000 psit.

The present mineral-containing layer(s) may be functionally bonded to internal and external label surfaces and also have at least one of its surfaces applied to the outer surface of the destination package or product for the purpose of labeling. Non-limiting adhesives that can be used for bonding the mineral-containing layer to the destination product or package surface can include polyesters with crystallization rates of from about 40 to about 90 and for polycarbonates from about 45 to about 90, having low to high heat resistance and thermo-plasticity as measured at about 60° C.

Other adhesive characteristics between the mineral layer and other surfaces within the label, or between the mineral-containing layer as an outer or inner label surface area bonded to the destination surface, may include adhesives having, without limitation: a DOT-T Peel of 1 N or more on Kraft paper as measured by ASTM 1876, a heat of fusion of 1-70 J/g and molecular weight up to about 60,000, having one of more tackifiers including aliphatic hydrocarbon resins, aromatic modified aliphatic hydrocarbon resins, hydrogenated polycyclopentadiene resins, polycyclopentadiene resins, gum rosins, gum rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated rosin esters, derivatives thereof, and/or combinations thereof.

Other adhesive characteristics between at least one side of the mineral-containing layer and other surfaces within the label, or between the mineral-containing layer as an outer or inner label surface area bonded to the destination surface, may include, without limitation, adhesives having one or more waxes such as polar waxes, non-polar waxes, oxidize and non-oxidized Fischer-Tropsch waxes, hydroxystearamide waxes, functionalized waxes, PP waxes, PE waxes, wax modifiers, and combinations thereof. The adhesive additives may include plasticizers, oils, stabilizers, antioxidants, pigments, dyestuffs, polymeric additives, defoamers, preservatives, thickeners, rheology modifiers, humectants, fillers, and water. The adhesive may further containing as desired aliphatic oils, white oils, combinations thereof, and/or derivatives thereof.

Additional functional bonding characteristics between the mineral-containing layer and other surfaces within the label, or between the mineral-containing layer as an outer or inner label surface area bonded to the destination surface, may include adhesives having, without limitation, polymeric additives including homo poly-alpha-olefins, copolymers of alpha-olefins, copolymers and terpolymers of diolefins, elastomers, polyesters, block copolymers, ester copolymers, acrylate polymers, alkyl acrylate polymers, and vinyl acetate polymers.

Other functional bonding characteristics between the mineral-containing layer and other surfaces within the label, or between the mineral-containing layer as an outer or inner label surface area bonded to the destination surface, may include non-hot melt adhesives having, without limitation, pH levels from about 6.5 to about 8.8, boiling points for non-hot melt at approximately 212° F., specific gravity from about 0.89 to about 1.61 g/cm$^3$, solids content from about 20% to about 85%, viscosities from about 70 mPa·s to about 150 mPa·s, and running temperatures up to 320° F.

Figure 9:
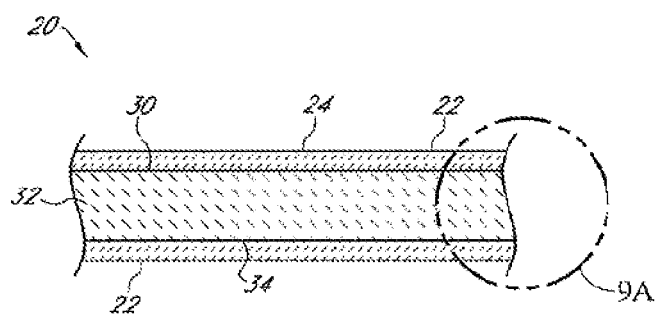
FIG. 9 is a schematic side cross-sectional view of a multilayer packaging composite material according to the present embodiments.
Figure 9A:
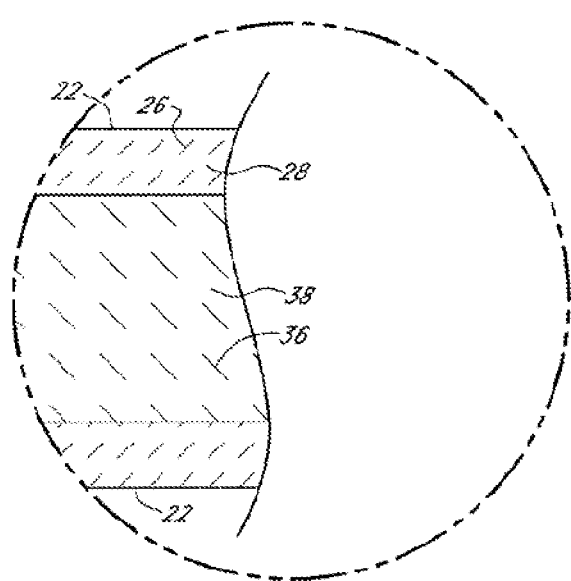
FIG. 9A is a detail view of the portion of FIG. 9 indicated by the circle 9A.

FIG. 9 is a schematic side cross-sectional view of a multilayer packaging composite material 20 according to the present embodiments. The illustrated embodiment includes a mineral-containing layer 22 having an outer or heat-sealable surface 24. FIG. 9A is a detail view of the portion of FIG. 9 indicated by the circle 9A. As shown in FIG. 9 A, a plurality of mineral particles 26 are interspersed within a bonding agent 28, which may be a thermoplastic. With reference to FIG. 9, the mineral-containing layer 22 may be substantially and continuously bonded to a first surface 30 of a fiber-containing layer 32. Another mineral-containing layer 22 may be substantially and continuously bonded to a second surface 34 of the fiber-containing layer 32, the second surface 34 being opposite the first surface 30. With reference to FIG. 9A, the fiber-containing layer 32 includes a plurality of fiber particles 36 interspersed within a bonding agent 38, which may be a thermoplastic. The thermoplastic bonding agent of either or both of the mineral-containing layer 22 and the fiber-containing layer 32 may comprise, for example and without limitation, polyolefin, polyester, or any other thermoplastic or polymer-containing resins.

The mineral-containing layer(s) 22 may include about 30% to about 65% minerals, and the minerals may comprise any of the minerals described throughout this specification and combinations thereof. The mineral-containing layer(s) 22 may be adhered to the fiber-containing layer 32 through coextrusion, extrusion-lamination, or any other suitable method or process. Extrusion-lamination may comprise a separately applied adhesive between the mineral- and fiber containing layers. The composite material 20 illustrated in FIG. 9 may advantageously be used as a single or multiple corrugate liner(s) or medium(s) within a single-layered or multilayered corrugated structure.

Figure 10:
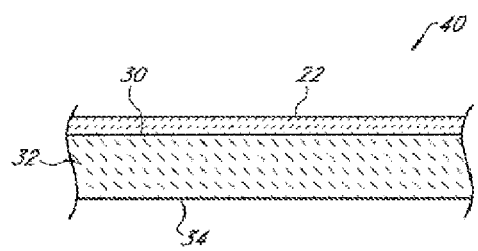
FIG. 10 is a schematic side cross-sectional view of another multilayer packaging composite material according to the present embodiments.

FIG. 10 is a schematic side cross-sectional view of another multilayer packaging composite material 40 according to the present embodiments. The illustrated embodiment includes a mineral-containing layer 22 substantially and continuously bonded to the first surface 30 of a fiber-containing layer 32. In contrast to the embodiment of FIG. 9, in the embodiment of FIG. 10 the second surface 34 of the fiber containing layer 32 is not bonded to a mineral-containing layer 22.

Figure 11:
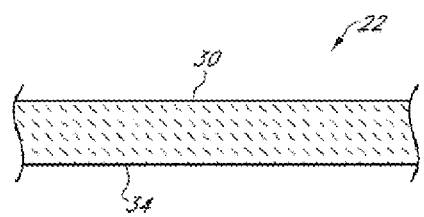
FIG. 11 is a schematic side cross-sectional view of a mineral-containing material according to the present embodiments.

FIG. 11 is a schematic side cross-sectional view of a mineral-containing material according to the present embodiments. The illustrated embodiment includes a mineral-containing layer 22 having both the first and second surfaces 30, 34 uncovered by a mineral-containing layer 22.

Figure 12:
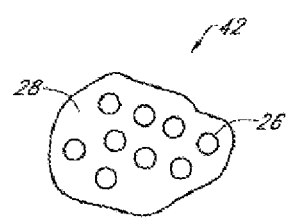
FIG. 12 is a schematic detail view of a pellet of a mineral-containing resin with mineral particles interspersed within a bonding agent according to the present embodiments.

FIG. 12 is a schematic detail view of a pellet 42 of a mineral-containing resin with mineral particles interspersed within a bonding agent, according to the present embodiments. Pellets such as that illustrated in FIG. 12 may be used in an extrusion process to adhere the mineral-containing layer 22 and the fiber-containing layer 32 to one another. With reference to FIG. 12, the mineral particles 26 are interspersed within the bonding agent 28 within the pellet 42.

Figure 13:
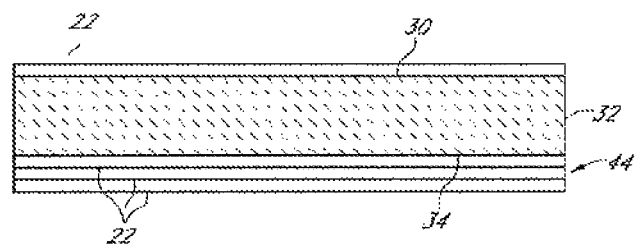
FIG. 13 is a schematic side cross-sectional view of another multilayer packaging composite material according to the present embodiments.

FIG. 13 is a schematic side cross-sectional view of another multilayer packaging composite material according to the present embodiments. The illustrated embodiment includes a first mineral-containing layer 22 substantially and continuously bonded to the first surface 30 of a fiber-containing layer 32. A second mineral-containing layer 44 is substantially and continuously bonded to the second surface 34 of the fiber-containing layer 32. The second mineral-containing layer 44 comprises three layers or plies of the first mineral-containing layer 22. The first and second mineral-containing layers 22, 44 may be secured to the fiber-containing layer 32 through any of the processes described herein, such as coextrusion, extrusion-lamination, etc., or through any other process. The plies 22 of the second mineral-containing layer 44 may be secured to one another through any of the processes described herein, such as coextrusion, extrusion lamination, etc., or through any other process. One or more of the plies 22 may comprise a mineral content and/or a bonding agent that is different from the mineral content and/or the bonding agent of another one or more of the plies 22. Further, the illustrated embodiment in which the second mineral-containing layer 44 comprises three layers or plies 22 is only one example. In other embodiments the second mineral-containing layer 44 may have any number of layers or plies 22, such as two layers or plies, four layers or plies, five layers or plies, etc. In yet further embodiments, the fiber-containing layer 32 may have a multilayer mineral-containing layer 44 adhered to both the first and second surfaces 30, 32.

Figure 14:
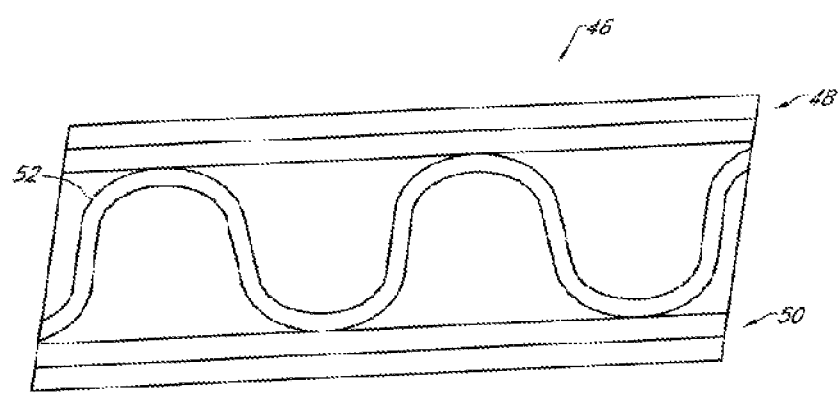
FIG. 14 is a schematic side cross-sectional view of another multilayer packaging composite material according to the present embodiments.

FIG. 14 is a schematic side cross-sectional view of another multilayer packaging composite material 46 according to the present embodiments. The material 46 of FIG. 14 includes multiple layers of any of the material layers described herein, such as a first dual layer 48 and a second dual layer 50 with a corrugated layer 52 therebetween.

The composite materials illustrated in the foregoing figures and described above are well-suited for use as packaging materials, such as for packages for containing one or more products. For example, and without limitation, such packages may comprise folding cartons and/or boxes. The package material has high performance heat seal characteristics, elevated barrier performance, is repulpable, and provides excellent cosmetics and favorable economics. The present composite materials can also be used as components, or layers, of multilayer packaging structures, such as corrugated boxes, and/or be used as a single-layer or multilayer corrugated liner or medium.

Example 1

Detergent Barrier Box Using Coextrusion

A 38.5% by weight mineralized HPDE-PE resin containing additives was compounded using finely wet ground $CaCO_3$ that was coated for dispersion with an approximately 1.0-1.5 micron mean particle size, limestone originating, $CaCO_3$ particles with incremental quartz and crystalline silica content. The specific heat of the ground $CaCO_3$ particles was 0.21 kcal/kg° C. The HDPE had a density of 0.949 g/cm³ and the PE had a density of 0.919 g/cm³. The HDPE-PE bonding agent had a melt flow index of 14 g/10 minutes. The finished and pelletized mineralized compound had an approximate density of 1.28 g/cm³. The compound was then coextruded using the mineralized HDPE-PE composite layer as a base layer applied at 22 g/m² coating thickness and contacting the uncoated side 320 g/m² weight Klabin virgin paper surface having a TAPPI T-441 Sheffield Smoothness of 74, a 7.5% moisture content, and TAPPI T 556 MD-CD Taber Stiffness of 39.9 and 17.4, respectively. The minor layer or top facing, outer, polymer layer of the coextrusion was about 8 g/m² weight. The base layer being predominately crystalline using the top layer to provide additional moisture barrier at box fracture from bend, scoring, and folding joints. The extrusion processing condition melt temperature for the base layer was approximately 580° F. with barrel temperatures from zone one to zone six from about 405° F. to 580° F. The base layer die temperature zone was approximately 575° F. to 580° F. The extruder die gap setting was within the range of 0.025" to 0.030". Unfilled Westlake® brand top neat PE layer processing was consistent with neat LDPE. The extruder air gap was approximately 6"-8", providing sufficient base layer oxidation and excellent adhesion use gas pre-heat, but without ozone or primer layers. Extrusion line speeds were within the range of 150-300 m/min. across a 50"-60" web width. Post-corona treatment was used. Roll stock was checked in process quality control for adhesion using "tape" testing and saturated for pin holing. Coat weight testing was done consistently using lab instrumentation. Finished and coated roll stock was rewound and sent for converting. Successful converting and packaging article forming, e.g. folding cartons/boxes, were done up to eight months post-extrusion coating. During converting, the roll stock was run on high speed detergent box production lines at speeds up to 500 cartons per minute. The enclosed detergent was sensitive to moisture exposure and was shipped in tropical moisture conditions. Glue seams and small, medium, and large carton sizes were successfully formed having sufficient fiber tear meeting standards with both room temperature and hot melt adhesives, including the manufacturer's seam. Moisture barrier testing was completed for large size sampling sizes, which included full converted and formed case samples having MVTR performance of 13.91 g/m²/24 hrs with a minimum of 13.03 g/m²/24 hrs, with a standard deviation of 0.86. These results compared to 40 g/m² in-line primed and then applied aqueous PVDC coatings on the same Klabin board having an average MVTR of 18.92 g/m²/24 hrs with a minimum of 16.83 g/m²/24 hrs, a maximum of 20.89 g/m²/24 hrs with a standard deviation of 2.00, and also compared to 20 micron thick BOPP primed and roll-to-roll laminated on the same Klabin board having an average MVTR of 15.03 g/m2/24 hrs with a minimum of 13.20 g/m2/24 hrs, a maximum of 16.64 g/m2/24 hrs with a standard deviation of 1.41.

Example 2

Monolayer 40% Mineralized Barrier Coating

A 43.5% by weight mineralized PE resin containing additives was compounded using finely ground and stearate coated 1.0-1.5 micron mean particle sized, limestone-originating, $CaCO_3$ particles with incremental quartz and crystalline silica content. The resin blend also had 5% titanium dioxide ($TiO_2$) for a total mineral content of 48.5% by weight. The ground $CaCO_3$ particles had a specific heat of 0.21 kcal/kg° C. The PE had a density of 0.919 g/cm³. The PE bonding agent had a melt flow index of 16 g/10 minutes. The finished and pelletized mineralized compound had an approximate density of 1.38 g/cm³. The compound was then extruded using the mineralized PE and $TiO_2$ composite layer as a mono layer applied at 32 lbs/3 msf coating weight contacting the uncoated side of Rock Term AngelCote® approximately 100% recycled fiberboard with nominal basis weight of 78 lbs/msf, with the paper surface having a TAPPI T-441 Sheffield Smoothness of approximately 68-72, a 5% to 7.5% moisture content, and TAPPI T 556 MD-CD Taber Stiffness g-cm of 320 and 105, respectively. The extrusion processing condition melt temperature was approximately 585° F. with barrel temperatures from zone one to zone six from about 400° F. to 585° F. The die temperature zones were approximately 575° F. to 585° F. The extruder die gap setting was within the range of 0.025" to 0.030". The extruder air gap was approximately 6"-10", providing excellent extrudate to fiber adhesion without a gas pre-heat, ozone, or primer layers. Extrusion line speeds were within the range of 150-400 feet per minute across a 80"-84" web width. Post-corona treatment was used. Roll stock was quality control checked in process for adhesion using "tape" testing and saturated for visual pin holing. Post-production coat weight testing was done consistently using lab instrumentation. Finished and coated roll stock was rewound and sent for converting. Successful converting and packaging forming was done up to three months post-extrusion coating. During converting the roll stock was run for use in high barrier MVR requirement frozen seafood box production lines at speeds up to 250 boxes per minute. The finished composite material was formed, bent, scored and machined at standard production rates. The mineral-containing surface layer was efficiently offset printed using standard industry inks and aqueous press coatings. The mineral coating layer was highly opaque and improved the brightness of the base paper surface from about 59 bright to about 76 bright. The mineral layer had a resident dyne level range of 44-48 as measured during post-production testing. Moisture barrier testing was completed for large size sampling sizes, which included full converted and formed case samples having MVTR performance of 12 to 16 g/m²/24 hrs @ 100% humidity in tropical conditions with mineral composite layer coat weights from 14 lbs/3 ms to 16 lbs/3 msf.

The present embodiments provide a composite packaging structure having mineral and fiber content that improve the material's printability, and make the material environmentally friendly, attractive to consumers, capable of being manufactured at high speeds, and having lower material costs. The composite structure requires less polymer content than existing materials and provides improved internal and external adhesion and heat seal characteristics during packaging forming.

Figure 15:
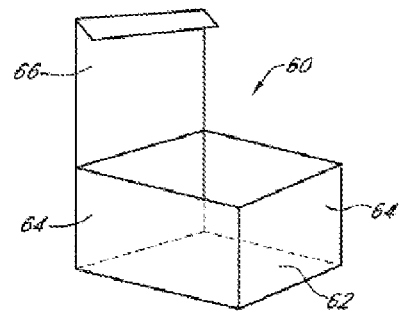
FIG. 15 is a container formed from a composite material according to the present embodiments.

The composite structures described herein are well suited to be formed into containers of various types. For example, FIG. 15 illustrates a container comprising a box 60. The box 60 may have many applications, such as, without limitation, retail and shipping. The box 60 may be in the form of a cube or other parallelepiped that is sized to contain an item for retail sale and/or shipping. The box 60 may be formed by preparing the composite structure in the form of a pliable sheet, for example by performing a milling step and/or other processing steps as described above, cutting the structure into a desired shape, and then folding and/or creasing the sheet, either manually or by machine, such as via an automated cartoning process, to form the final three-dimensional box shape. Abutting surfaces of the box 60 may be secured to one another using the various heat seal processes described herein and/or other heat seal processes known in the art. In the embodiment shown in FIG. 15, the composite structure forms the walls of the box 60, including a bottom wall 62, one or more side walls 64, as well as a fold-over lid portion 66.

Figure 16:
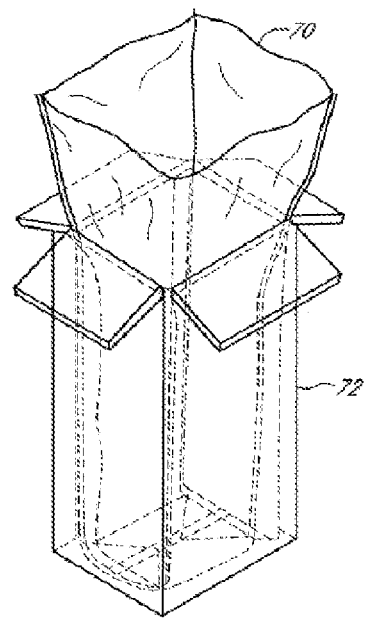
FIG. 16 is a container liner formed from a composite material according to the present embodiments.

In other embodiments, the composite structures described herein may be formed into a container liner 70 for retail and/or shipping use, as shown in FIG. 16. The liner 70 may be used to line a shipping or retail container 72 to cushion and/or protect a product held in the container 72, as well as to provide moisture resistance and deter infiltration of rodents and other pests. The liner 70 formed of the composite structure may be sufficiently flexible and pliable such that it is capable of at least partially conforming to the shape of the container 72.

Figure 17:
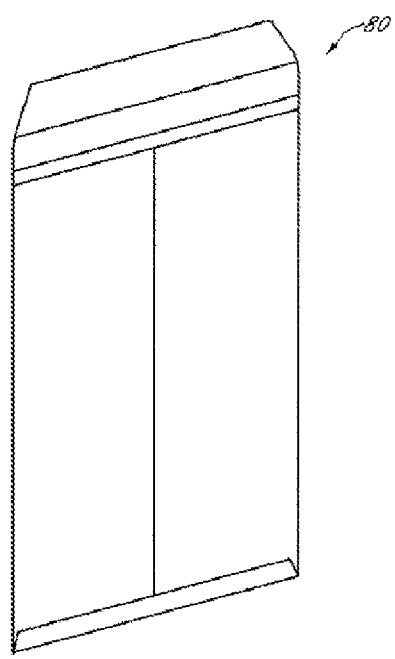
FIG. 17 is an envelope formed from a composite material according to the present embodiments.

In other embodiments, the composite structures described herein may be formed into a shipping mailer 80, such as an envelope, which may be used to ship documents and/or other items, as shown in FIG. 17. The composite structure may be used to form a part of or even all of the mailer structure 80, and may be fabricated by using a series of folding, creasing, and/or adhesive/heat seal steps to prepare the desired mailer shape.

Figure 18:
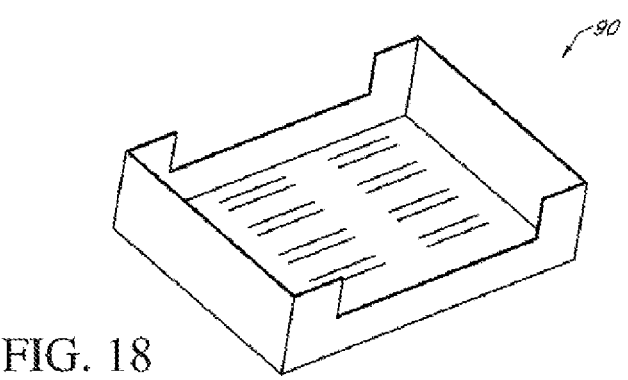
FIG. 18 is a display tray formed from a composite material according to the present embodiments.

In other embodiments, the composite structures described herein may be formed into a display tray 90 and/or other sales displays, as shown in FIG. 18. For example, the composite structure may be cut, shaped, and/or folded into the shape of a display tray 90 capable of holding and displaying products for retail sale. The composite structure can be molded by bending and/or folding, as well as via thermo and/or vacuum-forming to form desired parts of the display 90.

Other non-limiting examples of applications for which the present embodiments are well suited are described in one or more of the following publications, each of which is incorporated herein by reference in its entirety: U.S. Patent Application Publication Nos. 2009/0047499, 2009/0047511, and 2009/0142528.

The above description presents various embodiments of the present invention, and the manner and process of making and using them, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method of fabricating an environmental packaging material having improved thermal, processing, and structural properties, comprising:
    polymer bonding a plurality of particles to form a monolayer material suitable for converting,
    wherein polymer bonding to particles occurs in temperature ranges from about 180 degrees C. to about 410 degrees C.,
    wherein the plurality of particles have a mean diameter ranging from 150 µm to 0.05 µm used to form a polymer and particle bonded layer providing a printable surface, and
    wherein the bonded particles are formed into a pliable package container.

2. The method of claim 1 further comprising the additional step of recovering polymer contained within the reject particles.

3. The method of claim 1 wherein the density of the polymer content in the bonded layer is in the range of 0.8 to 1.4 g/cm3.

4. The method of claim 1, further comprising the addition of polyolefin plastomers and elastomers having the densities per ASTM D 792 from about 0.86 to about 0.891 g/cm3.

5. The method of claim 1 wherein the polymer content within the bonded layer is selected to provide a molecular weight (MZ) of from 150,000 to 300,000.

6. The method of claim 1 wherein the polymer content has a melt flow from 4 g/10 minutes to about 16 g/10 minutes.

7. The method of claim 1 wherein the polymer containing layer has coefficient of thermal expansion (CTE) in the range of ~10×10$^{-5}$ mm$^2$/° C.±20%.

8. The method of claim 1 wherein the printable surface comprises particles having an average surface area ranging from 1.0-1.3 m$^2$/g to about 1.8 to 2.3 m$^2$/g.

9. The method of claim 1 wherein containing cellulose having a density ranging from 0.3 to 0.7 g/cm$^3$.

10. The method of claim 1 wherein the mean hardness of the plurality particles ranges from 2.0 Mohs to 4.0 Mohs.

11. The method of claim 1 wherein the bonded layer is characterized by a modulus ranging from 1.8 GPa to 4.5 GPa.

12. The method of claim 1 wherein the material can be formed into rolls.

13. The method of claim 12 wherein the roll comprises fillers or paper coatings.

14. The method of claim 12 wherein the roll is characterized by having a surface smoothness ranging from 150 Bekk second to 200 Bekk second.

15. The method of claim 1 wherein the bonded layer comprises co-extruded polymer and particle content.

16. The method of claim 1 wherein addition of polyolefin and elastomers with DSC melting peaks from about 59° C. to about 110° C. can be considered having a 2% secant modulus, and MPa from about 15 to about 120.

17. The method of claim 1 wherein the material can be molded by bending and/or folding, as well as via thermo- and/or vacuum-forming.

18. The method of claim 1 further comprising cellulose fibers having a density ranging from 0.3 to 0.7 g/m$^2$.

19. The method of claim 1 wherein the particles have mean hardness ranges from 2.0 Mohs to 4.0 Mohs.

20. The method of claim 1 wherein the material layer is characterized by a modulus ranging from 1.8 GPa to 4.5 GPa.

21. The method of claim 1 wherein particle size can vary from 0.1 micron to 10.0 micron mean particle size and ultrafine nano particles ranging from 0.06 microns to 0.15 microns.

22. The method of claim 1 wherein the density of the polymer content in the bonded layer is in the range of 0.8 to 1.4 g/cm.

23. The method of claim 1 wherein the plurality of particles is characterized by having a mean Green Hunter reflectance range of 91% to 97% and a mean Blue Hunter reflectance range of 89% to 96%.

24. The method of claim 1 wherein the material is characterized by having an ash content of 1% w/w to 40% w/w.

25. The method of claim 1 wherein the bonded layer comprises co-extruded polymer and particle content.

26. The method of claim 1 further comprising the additional step of applying a polymer coating to rolls prior to the forming step.

27. The method of claim 1 wherein the polymer content includes glass.

28. The method of claim 1 wherein the polymer bonding agent comprises: polymers of monoolefins and diolefins, e.g. polypropylene, polyisobutylene, polybut-1-ene, poly-4-methylpent-1-ene, polyvinylcyclohexane, polyisoprene or polybutadiene, homogeneous mettallocene copolymers, and polymers of cycloolefins, e.g. cyclopentene or norbornene, polyethylene, cross-linked polyethylene, ethylene oxide and high density polyethylene, medium molecular weight high density polyethylene, ultra heavy weight high density polyethylene, low density polyethylene, very low density polyethylene, ultra low density polytheylene; copolymers of monoolefins and diolefins with one another or with other vinyl monomers, e.g. ethylene/propylene copolymers, linear low density polyethylene, and blends thereof with low density polyethylene, propylene but-1-ene, copolymers ethylene, propylene/isobutylene copolymers, ethylene/but-1-ene copolymers, ethylene/hexene copolymers, ethylene/octene copolymers, ethylene/methylepentene copolymers, ethylene/octene copolymers, ethylene/vinyelcyclohexane copolymers, ethylene/cycloolefin copolymers, COC, ethylene/I-olefin copolymers, the 1-olefin being produced in situ; propylene/butadiene copolymers, isobutylene/isoprene copolymers, ethylene/vinylcyclohexene copolymers, ethylene vinyl acetate copolymers, ethylene/alkyl methacrylate copolymers, ethylene/acrylic acid copolymers or ethyelene/acrylic acid copolymers and salts thereof (ionomers) and terapolymers of ethylene with propylene and diene, such as, for example, hexadiene, dicyclopentadiene or ethylidenenorbornene; homopolymers and copolymers that may have any desired three dimensional structure (stereo-structure), such as, for example, syndiotactic, isotactic, hemiisotactic or atactic stereoblock polymers are also possible; polystyrene, poly methylstyrene, poly alph-methystyrene, aromatic homopolymers and copolymers derived from vinylaromatic monomers, including styrene, alpha-methylstyrene, all isomers of vinyltoluene, in particular p-vinyletoluene, all isomers of ethylstyrene, propylstyrene, vinylbiphenyl, vinylnaphthalene and blends thereof, homopolymers and copolymers of may have any desired three dimensional structure, including syndiotactic, isotatic, hemiisotactic or atactic, stereoblock polymers; copolymer, including the above mentioned vinylaromatic monomers and commoners selected from ethylene, propylene, dienes, nitriles, acids, maleic anhydrides, vinyl acetates and vinyl chlorides or acryloyl derivatives and mixtures thereof, for example styren/butadiene, styrene/acrylonitrile, styrene/ethylene (interpolymers) styrene/alkymethacrylate, styrene/butadiene/alkyl acrylate, styrene/butadiene/alkyl methacrylate, styrene/maleic anhydride, styrene copolymers; hydrogen saturated aromatic polymers derived from by saturation of said polymers, including polycyclohexylethylene; polymers derived from alpha, beta-unsaturated acids and derivatives; unsaturated monomers such as acrylonitrile/butadiene copolymers acrylate copolymers, halide copolymers and amines from acyl derivatives or acetals; copolymers with olefins, homopolymers and copolymers of cyclic ethers; polyamides and copolyamides derived from diamines and dicarboxylic acids and or from aminocarboxylicacides and corresponding lactams; polyesters and polyesters derived from dicarboxylic acids and diols and from hydroxycarboxylic acids or the corresponding lactones; blocked copolyetheresters derived from hydroxyl terminated polyethers; polyketones, polysulfones, polyethersufones, and polyetherketones; cross-linked polymers derived from aldehydes on the one hand phenols, ureas, and melamines such as phenol/formaldehyde resins and cross-linked acrylic resins derived from substantial acrylates, e.g. epoxyacrylates, urethaneacrylates or polyesteracrylates and starch; polymers and copolymers of such materials as poly lactic acids and its copolymers, cellulose, polyhdyroxy alcanoates, polycaprolactone, polybutylene succinate, polymers and copolymers of N-vinylpyrroolidone such as polyvinylpyrrrolidone, and corsslinked polyvinylpyrrolidone, ethyl vinyl alcohol, polypropylene, high density polyethylene combined with MS0825 Nanoreinforced POSS polypropylene, thermoplastic elastomers, thermoplastic vulcinates, polyvinylchloride, polylactic acid, virgin and recycled polyesters, cellulosics, polyamides, polycarbonate, polybutylene tereaphthylate, polyester elastomers, thermoplastic polyurethane, cyclic olefin copolymer; biodegradable polymers such as Cereplast-Polylactic acid, Purac-Lactide PLA, Nee Corp PLA, Mitsubishi Chemical Corp GS PLS resins, Natureworks LLC PLA, Cereplast-Biopropropylene, Spartech PLA Rejuven 8, resins made from starch, cellulose, polyhydroxy alcanoates, polycaprolactone, polybutylene succinate or combinations thereof, such as Ecoflex FBX 7011 and Ecovio L Resins, polyvinylchloride and recycled and reclaimed polyester such as Nodax biodegradable polyester.

29. The method of claim 1 wherein the mineral-containing polymer layer can include coupling agents from about 0.05% to about 15% of the weight of the mineral-containing layer.

30. The method of claim 1 wherein the mineral content comprises wollanstonite, hydrated and non-hydrated, magnesium silicate, barium sulfate, barium ferrite, magnesium hydroxide, magnesium carbonate, aluminum trihydroxide, magnesium carbonate, aluminum trihydroxide, natural silica or sand, cristobalite, diaonite, novaculite, quartz tripoli clay calcined, muscovite, nepheliner-syenite, feldspar, calcium suphate-gypsum, terra alba, selenite, cristobalite, domite, silton mica, hydratized aluminum silicates, coke, montmorillonite (MMT), attapulgite (AT) carbon black, pecan nut flour, cellulose particles, wood flour, fly ash, starch, TiO2 and other pigments, barium carbonate, terra alba, selenite, nepheline-syenite, muscavite, pectolite, chrysotile, borates, sulfacates, nano-particles of the above from 0.01 to 0.25 micron particle size, and precipitated and ground calcium carbonate.

31. The method of claim 1, further comprising nano-cellulose in the mineral-containing composite layer, having a crystalline content from about 40%-70%, including nano-fibrils, micro-fibrils, and nanofibril bundles, having lateral dimensions from about 0.4-30 nanometers (nm) to several microns, and highly crystalline nano-whiskers from about 100 to 1000 nanometers; nano-cellulose fiber widths are from about 3-5 nm and from about 5-15 nm, having charge densities from about 0.5 meq/g to about 1.5 meq/g, with the nano-cellulose having a fiber widths are from about 3-5 nm and from about 5-15 nm, having charge densities from about 0.5 meq/g to about 1.5 meq/g, with the nano-cellulose having a stiffness from about an order of 140-220 MPa and tensile strength from about 400-600 MPa.

32. The method of claim 1 wherein the material polymer comprises 25%-65% cellulose content.

33. The method of claim 1 wherein the plurality of particles has mean maximum passage rate of 0.05% to 0.5% on 325 mesh per ASTM D1199.

34. The method of claim 1 wherein the bonded layer is characterized by a modulus ranging from 1.8 GPa to 4.5 GPa.

35. The method of claim 1 wherein the bonded layer is characterized in having a differential scanning calorimetry (DSC) melting peak ranging from 59° C. to 110° C.

36. The method of claim 1 wherein the heat seal is characterized in having activation temperatures ranges from 350° F. to 1100° F.

37. The method of claim 1 wherein the heat seal is characterized by a cooling rate ranging from $1.5°$ KJ min$^{-1}$ to about $4.5°$ KJ min$^{-1}$.

38. The method of claim 1 wherein the layer has improved barrier, opacity, increased stiffness, thermal conductivity, and strength.

39. The method of claim 1 wherein the thermal conductivity of the mineral-containing composite layer applied to the fiber-containing layer is preferably in the range of about 0.02-3 WK$^{-1}$ m$^{-1}$±20%.

40. The method of claim 1 wherein the layer polymerization initiator applicable isotatic polybutylenes show a melt flow of from 0.1 to 500.

41. The method of claim 1 wherein the preferred layer heat diffusivity in the range of about 0.02-3 WK$^{-1}$ m$^{-1}$, ±20%.

42. The method of claim 1 wherein inorganic contents have thermal conductivity values less than 1 to $8 \times 10^{-3}$±20%.

43. The method of claim 1 wherein the layer having filled fiber content from 1% to 30% with a Tappi 496, 402 tear strength of 56-250.

44. The method of claim 1 wherein the layer having filled fiber contain from 1% to 30% with Tappi 414 tear resistance from 49-250.

45. The method of claim 1 wherein the polymer bonding agent(s) of the mineral-containing layer may comprise polyolefin(s) having a number average molecular weight distributions (Mn) from about 5,500 to about 13,000, a weight average molecular weight (Mz) from about 170,000 to about 490,000, and/or a Z-average molecular weight (Mz) from about 170,000 to about 450,000.

46. The method of claim 1 wherein the CTE values for preferred inorganic layer fillers lie in the range of about 1 to $8 \times 10^{-6}$ in/in.

47. The method of claim 1 wherein the COF for mineralized polymer surfaces in the estimated range from about 0.18 to about 0.59.

48. The method of claim 1 wherein the layer particle content has coefficient of thermal expansion the range of $C=9\times10^{-6}$ @ 25 to 100° C. to $C=11.7\times10^{-6}$ @ 25 to 100° C.

* * * * *